US008304079B2

(12) United States Patent
Germroth et al.

(10) Patent No.: US 8,304,079 B2
(45) Date of Patent: Nov. 6, 2012

(54) OPTICAL COMPENSATION FILMS WITH BIREFRINGENCE ENHANCING SUBSTITUENTS FOR LIQUID CRYSTAL DISPLAY

(75) Inventors: Ted Calvin Germroth, Kingsport, TN (US); Xiaoliang Joe Zheng, Akron, OH (US); Thauming Kuo, Kingsport, TN (US); Dong Zhang, Uniontown, OH (US); Brian Michael King, Jonesborough, TN (US); Frank W. Harris, Boca Raton, FL (US); Jiaokai Alexander Jing, Uniontown, OH (US)

(73) Assignee: Akron Polymer Systems, Akron, OH (US)

( * ) Notice: Subject to any disclaimer, the term of this patent is extended or adjusted under 35 U.S.C. 154(b) by 917 days.

(21) Appl. No.: 11/731,366

(22) Filed: Mar. 29, 2007

(65) Prior Publication Data

US 2008/0241565 A1  Oct. 2, 2008

(51) Int. Cl.
*B32B 9/04* (2006.01)
*B32B 27/00* (2006.01)
(52) U.S. Cl. ..................................... 428/411.1; 428/500
(58) Field of Classification Search .................. None
See application file for complete search history.

(56) References Cited

U.S. PATENT DOCUMENTS

| | | | |
|---|---|---|---|
| 5,100,986 A | | 3/1992 | Favstritsky et al. |
| 5,119,221 A | * | 6/1992 | Nakajima et al. ............... 428/1.2 |
| 5,189,538 A | | 2/1993 | Arakawa |
| 5,213,852 A | | 5/1993 | Arakawa et al. |
| 5,290,887 A | | 3/1994 | Hefner et al. |
| 5,387,657 A | | 2/1995 | Hefner et al. |
| 5,529,818 A | | 6/1996 | Tsuda et al. |
| 6,115,095 A | | 9/2000 | Suzuki et al. |
| 6,175,400 B1 | | 1/2001 | Duncan et al. |
| 7,037,443 B2 | | 5/2006 | Shuto et al. |
| 7,135,211 B2 | | 11/2006 | Shuto et al. |
| 7,227,602 B2 | | 6/2007 | Jeon et al. |
| 7,236,221 B2 | | 6/2007 | Ishikawa et al. |
| 7,391,935 B2 | | 6/2008 | Kawahara et al. |
| 2004/0051831 A1 | | 3/2004 | Su Yu et al. |
| 2004/0242823 A1 | * | 12/2004 | Sekiguchi et al. ............ 526/279 |
| 2005/0057714 A1 | | 3/2005 | Jeon et al. |
| 2005/0200792 A1 | | 9/2005 | Jeon et al. |
| 2005/0270458 A1 | | 12/2005 | Ishikawa et al. |
| 2006/0114383 A1 | | 6/2006 | Kobayashi et al. |
| 2007/0160828 A1 | | 7/2007 | Iyama |
| 2007/0206140 A1 | | 9/2007 | Ting et al. |
| 2009/0002606 A1 | * | 1/2009 | Tomonaga et al. ............ 349/96 |
| 2009/0185121 A9 | | 7/2009 | Suemasu et al. |

FOREIGN PATENT DOCUMENTS

EP  1 506 991  2/2005

OTHER PUBLICATIONS

Zhang D et al. "Mesogen-Jacketed Liquid Crystal Polymers with Mesogens of Aromatic Amide Structure" Polymers for Advanced Technologies, Wiley & Sons, Bognor Regis, GB, vol. 8, No. 4, Apr. 1, 1997, pp. 227-233, XP000691535.
Zhang et al., "Synthesis of a New Side-Chain Type Liquid Crystal Polymer Poly[dicyclohexyl vinylterephtalate]" Macromolecules, ACS, Washington, DC, US, vol . 32, Jan. 1, 1999,pp. 4494-4496, XP002495422, ISSN: 0024-9297.
Zhao et al., "Synthesis and characterization of diblock copolymers based on crystallizable poly($\epsilon$-caprolactone) and mesogen-jacketed liquid crystalline polymer block" Polymer, Elsevier Science Publishers B.V, GB, vol. 46, No. 14, Jun. 27, 2005, pp. 5396-5405, XP004924379, ISSN: 0032-3861.
Li et al. "Hierarchical Assembly of a Series of Rod-Coil Block Copolymers: Supramolecular LC Phase in Nanoenviroment", Macromolecules 2004, 37, 2854-2860.
Luo et al. "Conduction mechanism in a novel oxadiazole derivative: effects of temperature and hydrostatic pressure", J. Phys. D: Appl. Phys. 38 (2005) 1132-1135. IOP Publishing Ltd Printed in the UK.
Chai et al. "Synthesis and characterization of mesogen-jacketed liquid crystalline polymer containing 1,3,4-oxadiazole", Gaofenzi Xuebao 2006(3) 532-535.
International Search Report dated Sep. 3, 2008 issued in PCT Application No. PCT/US2008/057813.
International Search Report dated Sep. 4, 2008 issued in corresponding PCT Application No. PCT/US2008/057811.
Database WPI Week 199238, Thomson Scientific, London, GB; AN1992-311534, XP002493166.
Tenneti et al. "Perforated Layer Structures in Liquid Crystalline Rod-Coil Block Copolymers" J. Am. Chem. Soc. 2005, 127, pp. 15481-15490.
Zhang et al. "Synthesis and characterization of novel rod-coil diblock copolymers of poly(methyl methacrylate) and liquid crystalline segments of poly(2,5-bis[(4-methoxyphenyl)oxycarbonyl] styrene)", Polym Int 52:92-97 (2003).
Ye et al. "Molecular Weight Dependence of Phase Structures and Transitions of Mesogen-Jacketed Liquid Crystalline Polymers Based on 2-Vinylterephthalic Acids" Macromolecules 2004, 37, 7188-7196.
Wan et al. ""Living" Free Radical Synthesis of a Novel Rodcotl Diblock Copolymers With Polystyrene and Mesogen-Jacketed Liquid Crystal Polymer Segments" Chinese Journal of Polymer Science, (1998) vol. 16 No. 4.
Chen et al. "Design, Synthesis, and Characterization of Bent-Core Mesogen-Jacketed Liquid Crystalline Polymers" Macromolecules 2006, 39, 517-527.
European Examination Report dated Aug. 4, 2011 issued in corresponding European Application No. 08 732 649.2.

* cited by examiner

*Primary Examiner* — Sheeba Ahmed
(74) *Attorney, Agent, or Firm* — Kenyon & Kenyon LLP

(57) ABSTRACT

Optical compensation films (positive C-plate) with anisotropic subunits (OASUs) that are aromatic rings substituted with birefringence enhancing substituents (BES) and have high positive birefringence throughout the wavelength range 400 nm<$\lambda$<800 nm are provided. The optical compensation films may be processed by solution casting to yield a polymer film with high birefringence without the need for stretching, photopolymerization, or other processes. Such optical compensation films are suitable for use as a positive C-plate in LCDs, particularly IPS-LCDs.

96 Claims, 11 Drawing Sheets

$D = 2.51 \text{ Å}$ $R = 6.7 \text{ Å}$
$R = 2*\cos 30°*(d_{C-C}+d_{C-H})+2*r_H$
$\quad = 2*0.866*(1.4+1.1)+2*1.2 = 6.7 \text{ (Å)}$
$R/D = 6.7/2.51 = 2.7$ $D = 2.51 \text{ Å}$ $R = 7.9 \text{ Å}$ $R/D = 7.9/2.51 = 3.2$

D = 2.51 Å

R = 9.1 Å

R/D = 9.1/2.51 = 3.6

D = 2.51 Å

R = 10.3 Å

R/D = 10.3/2.51 = 4.1

(a)

● represents end view of backbone (b)

OPTICAL COMPENSATION FILMS WITH BIREFRINGENCE ENHANCING SUBSTITUENTS FOR LIQUID CRYSTAL DISPLAY

1. FIELD OF THE INVENTION

The invention relates to optical compensation films with positive birefringence greater than 0.002 throughout the wavelength range of 400 nm<λ<800 nm for use in optical devices such as liquid crystal display ("LCD") devices, optical switches and waveguides where a controlled light management is desirable. More particularly, the optical compensation films are for use in an in-plane switching LCD ("IPS-LCD").

2. BACKGROUND OF THE INVENTION

LCDs are used as display screens in many common applications including digital clocks, microwaves, laptop computers, calculators and other electronic devices LCDs offer advantages over luminescent display technologies such as cathode ray tubes (CRTs) because they are lighter, thinner and require less voltage and power to operate.

LCD screens have good picture quality and contrast when viewed directly, i.e. at an angle that is perpendicular, or normal, to the plane of the screen. However, picture quality and contrast decline as the viewing angle increases. Image degradation occurs because the LC cell is birefringent and splits the entering light beam into two light beams (ordinary and extraordinary) that propagate through the LC cell in different directions and different speeds. The ordinary and extraordinary rays move in different planes, at different speeds and have different indices of refraction ($n_o$ and $n_e$, respectively). The ordinary ray travels in a direction parallel to the direction of the liquid crystals, while the extraordinary ray travels in a direction perpendular to the direction of the liquid crystals. Since light beams at different angles experience different retardations, poor image quality occurs at higher viewing angles. Optical compensation films are used to improve the image quality at high viewing angles by correcting for the variation between ordinary and extraordinary indices of refraction of the light beams passing through the LC cell.

An IPS-LCD device is a type of LCD with LC molecules that lie in-plane, i.e. parallel to the substrate and parallel to each other. An IPS-LCD generally includes a liquid crystal (LC) layer having positive or negative dielectric anisotropy a pair of glass substrates sandwiching the LC layer, and a pair of polarizing films sandwiching the glass substrates and the LC layer together. The LC layer is applied with a lateral electric field that is parallel to the substrates to control the direction of the LC molecules for image display. In the off position, the molecules of liquid crystal lie parallel to the glass substrates and to each other and the cell's electrode pair. When a voltage is applied across the electrode pair, the LC molecules can all rotate freely through 45° to align themselves with the field, while remaining parallel to the substrates and other molecules above and below them.

Since IPS-LCDs have molecules that are aligned in-plane, light moving through the LC parallel to the plane of molecules plane of the has a higher index of refraction than light moving in the direction perpendicular to the molecules. Thus, light passing through the IPS LC cell has the relationship $n_\| \gg n_\perp$, or $n_e \gg n_o$. In other words, light moving parallel to the LC molecules in the x or y directions on a Cartesian plane has a higher index of refraction than light moving perpendicular to the LC molecules in the z direction.

Optical compensation films with positive birefringence (positive C-plates) are used to compensate for the imbalance created by an IPS-LCD by providing an optical compensation film wherein $n_\perp \gg n_\|$, or $n_o \gg n_e$. The optically anisotropic units in positive C-plates are aligned perpendicularly to the substrate in general so that light moving in the z direction has a higher index of refraction than light moving in the x or y direction.

Birefringence, Δn, measures the difference between the indices of refraction of the ordinary and extraordinary rays:

$$\Delta n = n_o - n_e = n_\perp - n_\|$$

An IPS-LC's cell has a birefringence characterized by $n_\| > n_\perp$. Thus, the positive C plate needs a birefringence characterized by $n_\perp \gg n_\|$ to compensate the IPS-LC cell. The greater $n_\perp$ is compared to nil in a positive C plate, the greater the difference in their refractive indices and the higher the birefringence of the compensation film. High birefringence in a compensation film creates a more effective C plate.

The concept of a positive C-plate is known in the art as are some compositions of positive C-plates such as polystyrene. However, polystyrene compensation films are limited because $n_\perp$ is only slightly higher than $n_\|$. Thus, polystyrene films are poor compensators for LC cells, and a relatively thick polystyrene film is needed to appreciate any significant LC cell compensation.

Positive C-plates made of poly(vinylcarbazole) are also known in the art. Poly(vinylcarbazole) compensation films have higher birefringence than polystyrene films, but are photolytically unstable and decompose when exposed to light. Thus, poly(vinylcarbazole) compensation films are not a commercially viable positive C-plate because they are unstable.

Current commercial positive C-plate materials require expensive post-synthesis processing such as locking liquid crystal molecules into a perpendicular alignment by photopolymerization. Without the photopolymerization step, the film would not have the proper birefringence to function as a compensation film.

US Patent Application No. 2005/0200792 A1 discloses an in-plane switching liquid crystal display comprising a negative biaxial retardation film and a positive C-plate as a viewing angle compensation film.

US Patent Application No. 2005/0140900 A1 discloses an IPS-LCD comprising a positive A-plate and a positive C-plate. No chemical composition of the positive C-plate is disclosed.

US Patent Application No. 2005/0270458 A1 discloses a multilayer optical compensation film comprising optically anisotropic first and second layers, wherein the second layer includes amorphous polymer with a glass transition temperature above 160° C., and the indices of refraction satisfy the relations $|n_x - n_y| < 0.001$ and $n_z - (n_x + n_y)/2 > 0.005$.

U.S. Pat. No. 5,189,538 discloses a liquid crystal display comprising a film having light transmission properties that includes a uniaxially stretched polymer film with positive intrinsic birefringence.

U.S. Pat. No. 6,115,095 discloses an in-plane switching LCD comprising a first compensation layer having positive uniaxial, optical anisotropy, and an optical axis extending perpendicularly to the substrate. No chemical compositions of the compensation layer are disclosed.

U.S. Pat. No. 6,175,400 discloses a broadband cholesteric optical device having a broadband cholesteric layer and a compensator in the form of a positive birefringence film whose optic axis is substantially perpendicular to the film.

US Patent Application No. 2005/0037155 discloses a retardation plate obtained by laminating a homeotropic liquid-crystal film and a photopolymerizable liquid crystalline compound to a stretched film having a retardation function.

US Patent Application No. 2005/0122456 discloses an optical film with a substrate without a vertical alignment layer and a homeotropic alignment liquid crystal film layer formed on the substrate. The homeotropic alignment liquid crystal film layer comprises a homeotropically aligned liquid crystal polymer Thus, there remains a need for an optical compensation film having a large positive birefringence value without being subject to expensive processes such as stretching, photo irradiation, and heat treatment. The optical compensation film should be stable at ambient conditions, optically transparent, have low color, and be easy to apply onto a substrate.

3. SUMMARY OF THE INVENTION

An object of the invention is to provide a non-stretched, non-photopolymerized polymer film for use in positive birefringence layers in liquid crystal displays, the film being stable at ambient conditions, the film having a positive birefringence greater than 0.002 throughout the wavelength range of 400 nm<$\lambda$<800 nm, the film having been cast onto a substrate from a solution of a soluble polymer having a moiety of

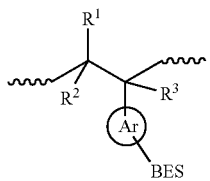

wherein $R_1$, $R_2$, and $R_3$ are each independently hydrogen atoms, alkyl groups, substituted alkyl groups, or halogens; wherein Ar-BES is an optically anisotropic subunit (OASU) that is attached directly to the polymer backbone via at least one covalent bond, wherein Ar is an aromatic ring structure, BES represents at least one birefringence enhancing substituent; and wherein the Ar-BES is oriented perpendicular to the polymer backbone, and the higher the perpendicularity of the Ar-BES, the larger the value of the positive birefringence of the polymer film. In one embodiment, the polymer film is a homopolymer.

In one embodiment, the compensation film is capable of forming an out-of-plane anisotropic alignment upon solvent evaporation without being subject to heat treatment, photo irradiation, or stretching and has a positive birefringence greater than 0.002, greater than 0.005, or greater than 0.01 throughout the wavelength range of 400 nm<$\lambda$<800 nm. In another embodiment, the compensation film is removed from the substrate upon drying to yield a free-standing film, which may be uniaxially or biaxially stretched. The free-standing film may be attached to a substrate by lamination with or without stretching.

In another embodiment of the invention, the polymer composition is soluble in a solvent such as toluene, methyl isobutyl ketone, cyclopentanone, and a mixture thereof. In one embodiment, BES is nitro- or bromo-. In another embodiment, the compensation film is used in a liquid crystal display device including an in-plane switching liquid crystal display device. The liquid crystal display device may be used as a screen for a television or computer.

In one embodiment, the degree of substitution of the BES may be controlled. In another embodiment, degree of substitution of the BES is greater than 0.5. In yet another embodiment, BES is nitro-, bromo-, iodo-, cyano- or phenyl-. Preferably, BES is nitro- or bromo-. In one embodiment, the aromatic ring is benzene, biphenyl, naphthalene, anthracene, phenanthrene, naphthacene, pentacene, or triphenyl. Preferably, the aromatic ring is benzene. In another embodiment, BES is nitro- or bromo- and the aromatic ring is benzene, biphenyl, naphthalene, anthracene, phenanthrene, naphthacene, pentacene, or triphenyl.

In a preferred embodiment, the polymer film is poly(nitrostyrene). The poly(nitrostyrene) may have a positive birefringence greater than 0.007 throughout the wavelength range of 400 nm<$\lambda$<800 nm. The poly(nitrostyrene) may have a degree of substitution greater than 0.7 for the nitro group. Also, the poly(nitrostyrene) may have a degree of substitution greater than 0.5 or greater than 0.7 for the nitro group. The polymer film may have BES that have some para-nitro groups or that have mostly para-nitro groups. In one embodiment, poly(nitrostyrene) has mostly para-nitro groups and a degree of substitution greater than 0.5 or greater than 0.7 for the nitro group.

In another preferred embodiment, the polymer is poly(bromostyrene). The poly(bromostyrene) may have a positive birefringence greater than 0.005 throughout the wavelength range of 400 nm<$\lambda$<800 nm. The poly(bromostyrene) may have a degree of substitution greater than 0.7 for the bromo group. Also, the poly(bromostyrene) may have a degree of substitution greater than 0.5 or greater than 0.7 for the bromo group. The polymer film may have BES that have some para-bromo groups or that have mostly para-bromo groups. In one embodiment, poly(bromostyrene) has a degree of substitution greater than 0.5 or greater than 0.7 for the bromo group.

The invention also provides a non-stretched, non-photocopolymerized copolymer film for use in positive birefringence layers in liquid crystal displays, the film being stable at ambient conditions, the film having a positive birefringence greater than 0.002 throughout the wavelength range of 400 nm<$\lambda$<800 nm, the film having been cast from a solution of a soluble copolymer having a moiety of:

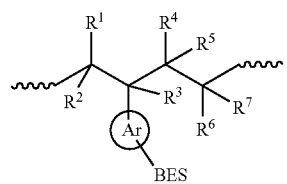

wherein $R^1$, $R^2$, $R^3$, $R^4$, $R^5$, and $R^7$ are each independently hydrogen atoms, alkyl groups, substituted alkyl groups, or halogens; wherein $R^6$ is a hydrogen atom, alkyl, substituted alkyl, halogen, ester, amide, ketone, ether, cyano, phenyl, epoxy, urethane, urea or optically anisotropic subunit (OASU) attached directly to the backbone of the residue of an ethylenically unsaturated monomer; wherein Ar-BES is an optically anisotropic subunit (OASU) that is attached directly to the copolymer backbone via at least one covalent bond. Ar is an aromatic ring structure with at least one birefringence enhancing substituent (BES), wherein the Ar-BES is oriented perpendicular to the copolymer backbone, and the higher the perpendicularity of the Ar-BES, the larger the value of the positive birefringence of the copolymer film. In one embodiment, $R^6$ is an Ar-BES. In another embodiment, the copolymer has at least two different Ar-BES groups.

In one embodiment, the copolymer's at least one ethylenically unsaturated monomer is styrene, vinyl biphenyl, methyl methacrylate, butyl acrylate, acrylic acid, methacrylic acid, acrylonitrile, 2-ethylhexyl acrylate, or 4-t-butylstyrene. In another embodiment, the at least one monomer of the copolymer includes styrene.

In one embodiment, the compensation film is capable of forming an out-of-plane anisotropic alignment upon solvent evaporation without being subject to heat treatment, photo irradiation, or stretching and has a positive birefringence greater than 0.002 or greater than 0.005 or greater than 0.01 throughout the wavelength range of 400 nm<$\lambda$<800 nm. In another embodiment, the compensation film is removed from the substrate upon drying to yield a free-standing film, which may be uniaxially or biaxially stretched. The free-standing film may be attached to a substrate by lamination with or without stretching.

In another embodiment, the polymer composition is soluble in a solvent such as toluene, methyl isobutyl ketone, cyclopentanone, and a mixture thereof. In another embodiment, BES is nitro- or bromo-. In yet another embodiment, the compensation film is used in a liquid crystal display device including an in-plane switching liquid crystal display device. The liquid crystal display device may be used as a screen for a television or computer.

In another embodiment, the degree of substitution of the BES may be controlled. In one embodiment, the degree of substitution of the BES is greater than 0.5. BES may be nitro-bromo-, iodo-, cyano- or phenyl-, and is preferably nitro- or bromo-. The aromatic ring may be benzene, biphenyl, naphthalene, anthracene, phenanthrene, naphthacene, pentacene, or triphenyl but is preferably benzene. In one embodiment, BES is nitro- or bromo- and the aromatic ring is benzene, biphenyl, naphthalene, anthracene, phenanthrene, naphthacene, pentacene, or triphenyl.

In a preferred embodiment, the polymer is poly(nitrostyrene-co-styrene). The poly(nitrostyrene-co-styrene) may have a degree of substitution for the nitro group that is greater than 0.5 or greater than 0.7. Some BES may be para-nitro groups, or nearly all BES may be para-nitro groups. In one embodiment, poly(nitrostyrene-co-styrene) has nearly all BES as para-nitro groups a degree of substitution greater than 0.5 or greater than 0.7 for the nitro group.

In another preferred embodiment, the polymer is poly(bromostyrene-co-styrene). The poly(bromostyrene-co-styrene) may have a degree of substitution for the bromo group that is greater than 0.5 or greater than 0.7. Some BES may be para-bromo groups, or nearly all BES may be para-bromo groups. In one embodiment, poly(bromostyrene-co-styrene) has nearly all BES as para-bromo groups and a degree of substitution greater than 0.5 or 0.7 for the bromo group.

4. DESCRIPTION OF THE DRAWINGS

FIG. 1 is a depiction of several OASUs and the frameworks for calculating the buttressing factor for these OASUs. FIGS. 1a and 1b depict the OASU of polystyrene FIGS. 1c-1d depict the disk OASU of, poly(2-vinyl naphthalene). FIGS. 1e-1f depict the disk OASU of poly(1-vinyl naphthalene). FIGS. 1g-1h depict the disk OASU of poly(vinylpyrene). FIG. 1i depicts the mesogen OASU, of poly[2,5-bis(p-alkoxyphenyl) styrene].

FIG. 2 is a depiction of the framework for calculating the buttressing factor for polystyrene. FIG. 2a shows the point on the polymer backbone at which the OASU of reference (the benzene ring) will be attached. FIG. 2b shows a segment of the polymer backbone in the extended chain conformation. FIG. 2c shows the distance D formed when the two OASU-attaching points are joined by a straight line. FIG. 2d shows the covalent bond from a carbon atom of the polymer backbone to the attaching atom of the OASU. FIG. 2e shows the structure of benzene attached to the polymer backbone and its known bond lengths and bond angles. FIG. 2f shows the benzene ring with parallel vertical lines drawn at intervals such that calculating the distances of segments of the OASU is possible for each interval.

Figure 7:
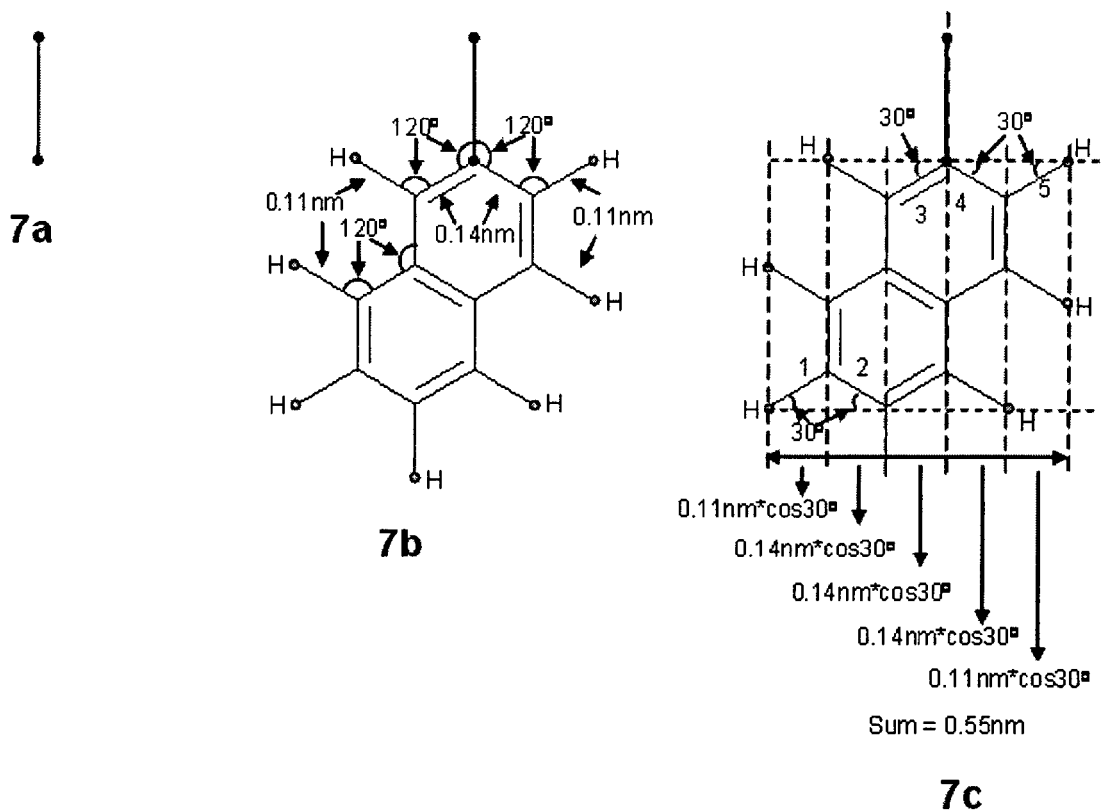

FIG. 7 is a depiction of the framework for calculating the buttressing factor for poly(2-vinyl naphthalene). FIG. 7a shows the covalent bond from a carbon atom of the polymer backbone to the attaching atom of the OASU. FIG. 7b shows that all of the carbon-carbon bond lengths of the naphthalene ring are 0.14 nm, all bond angles of the naphthalene ring are 120°, and all carbon-hydrogen bond lengths of the naphthalene ring are 0.11 nm. FIG. 7c shows that when parallel lines are drawn through the center of each atom of the OASU, the bond angles of bonds 1, 2, 3, 4 and 5 with respect to the horizontal length of the OASU are all 30°.

Figure 8:
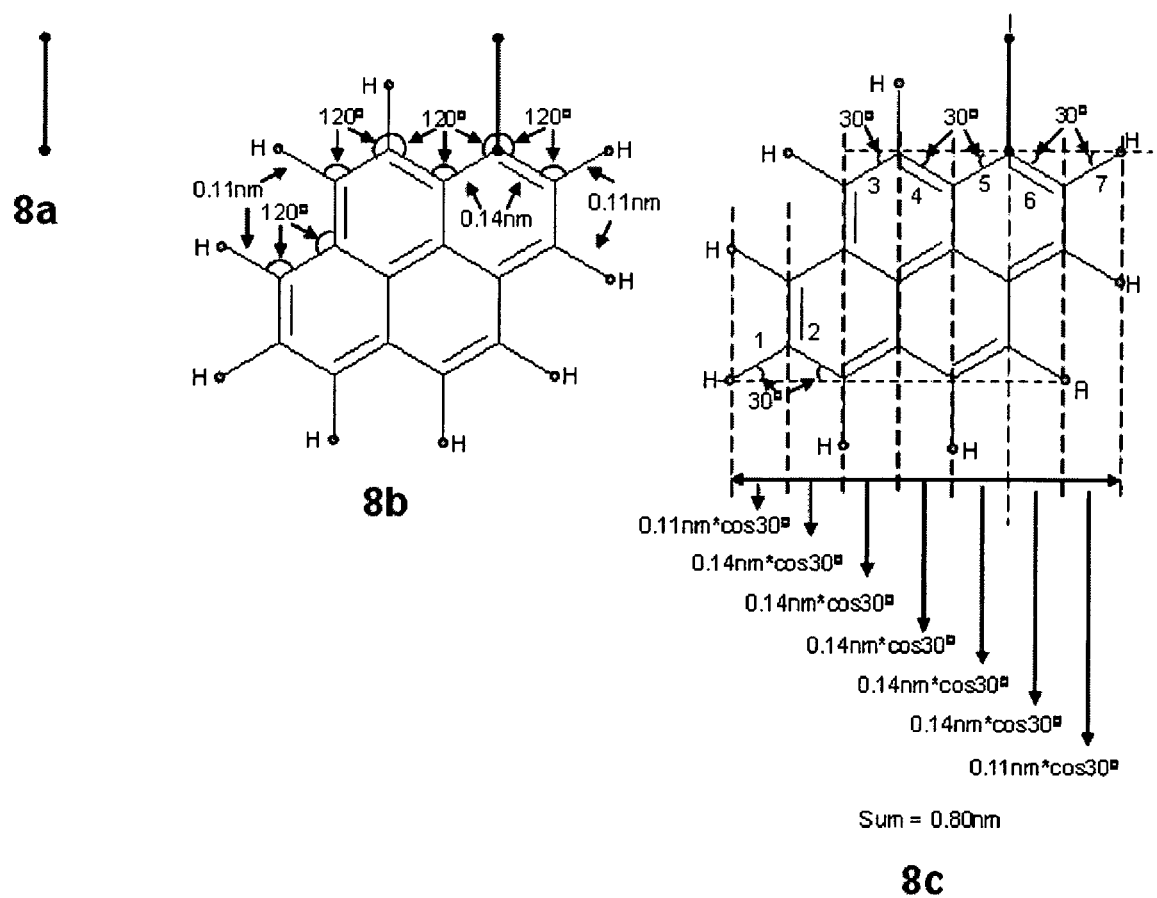

FIG. 8 is a depiction of the framework for calculating the buttressing factor for poly(vinylpyrene). FIG. 8a shows the covalent bond from a carbon atom of the polymer backbone to the attaching atom of the OASU. FIG. 8b shows that all of the carbon-carbon bond lengths of the pyrene ring are 0.14 nm, all bond angles of the pyrene ring are 120°, and all carbon-hydrogen bond lengths of the pyrene ring are 0.11 nm. FIG. 8c shows that when parallel lines are drawn through the center of each atom of the OASU, the bond angles of bonds 1, 2, 3, 4, 5, 6 and 7 with respect to the horizontal length of the OASU are all 30°.

Figure 9:
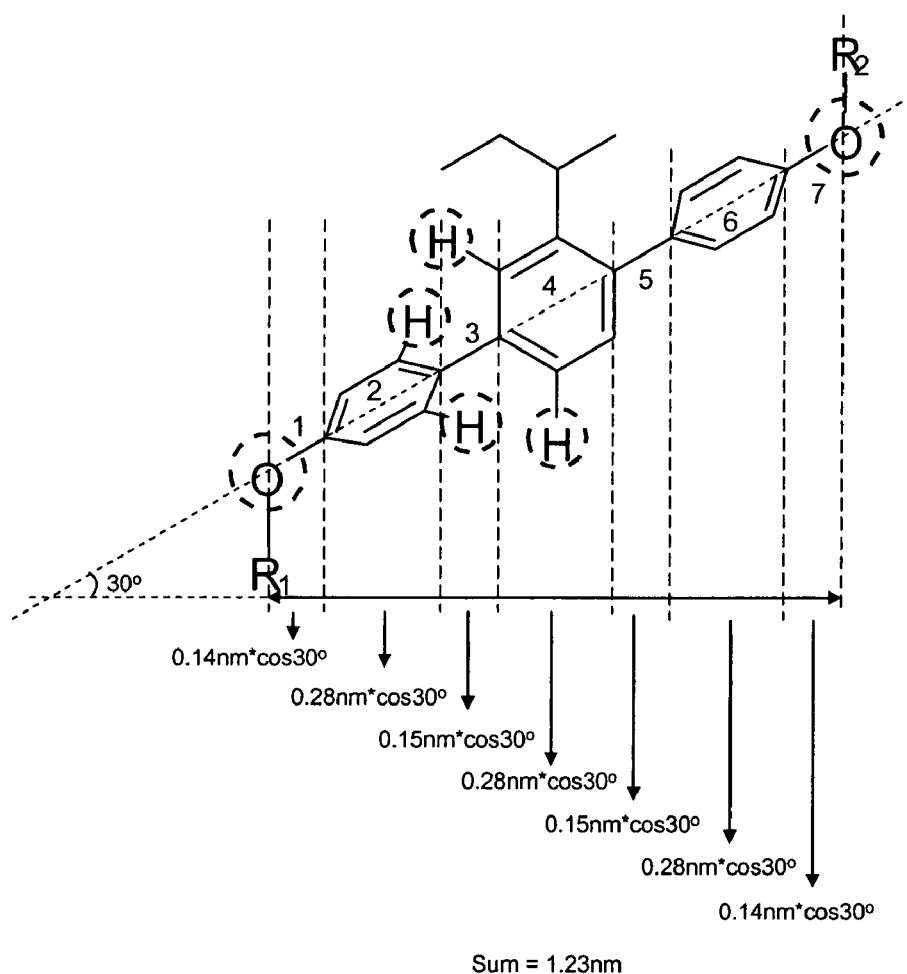

FIG. 9 is a depiction of the framework for calculating the buttressing factor for poly[2,5-bis(p-alkoxyphenyl)styrene].

5. DETAILED DESCRIPTION OF THE INVENTION

In one example embodiment of the invention is an optical compensation film with positive birefringence greater than 0.002 throughout the wavelength range of 400 nm<$\lambda$<800 nm and may form an out-of-plane anisotropic alignment upon solvent evaporation when made by solution casting. Accordingly, the optical compensation films of the invention may be aligned anisotropically such that the net optical axis of a rod-like OASU (in the rod-direction) is out-of-plane (where out-of-plane includes but is not limited to optical axes that are perpendicular to the plane), and the net optical axis of a disk-like or Ar-BES OASU (in the disk normal direction) is in-plane (where in-plane includes but is not limited to optical axes that are parallel to the plane). The optical compensation films of the invention may be used as part of a liquid crystal display (LCD) device, particularly an in-plane switching (IPS) LCD. The LCD may be used in electronic devices with display screens including, but not limited to, televisions, computers, cell phone, clocks, microwaves and calculators.

The polymer film with high positive birefringence has a moiety containing a light stable OASU in the polymer backbone. The OASU may be attached directly to the polymer backbone through one covalent bond so the moiety has the general formula:

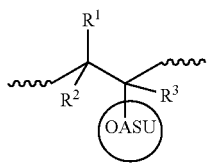

wherein $R^1$, $R^2$, and $R^3$ are each independently hydrogen atoms, alkyl groups, substituted alkyl groups, or halogens, and OASU is an optically anisotropic sub-unit. The OASU may also be attached directly to the polymer backbone through two independent covalent bonds so the moiety has the general formula:

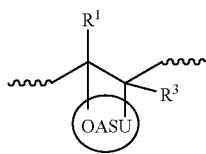

wherein $R^1$, $R^2$, and $R^3$ are each independently hydrogen atoms, alkyl groups, substituted alkyl groups, or halogens, and OASU is an optically anisotropic sub-unit. The covalent bond provides a direct connection between the OASU and the polymer backbone that other atoms are not positioned along the covalent bond, which would make the connection between the OASU and the polymer backbone indirect.

The polymer film may be a homopolymer or a copolymer. The copolymer may have one or more moieties containing an OASU attached directly to the polymer backbone through at least one covalent bond. The description of the invention applies to any OASU-containing homopolymer or copolymer with any combination of moieties. As used herein, the term "polymer" refers to homopolymers and copolymers.

The OASU may be disk-like, rod like (mesogen), or aromatic rings (Ar) substituted with birefringence enhancing substituents (BES). In a preferred embodiment, the OASU is oriented perpendicular to the polymer backbone, and the value of the positive birefringence of the polymer film increases with increasing perpendicularity of the OASUs.

The polymer solutions may advantageously form an out-of-plane anisotropic alignment upon solvent evaporation and solution film casting without being subject to heat treatment, photo irradiation, or a stretching process (although one or a combination of these processes may be used to further entrance birefringence). The resulting buttressed polymer films are stable at ambient conditions, have high positive birefringence and may be inexpensive to produce. Positive birefringence is defined as $n_z > (n_x + n_y)/2$, wherein $n_x$ and $n_y$ represent in-plan refractive indexes, and $n_z$ represents the thickness-direction refractive index of the film. These polymers and the optical compensation films made therefrom, each has positive birefringence greater than 0.002 throughout the wavelength range of 400 nm<$\lambda$<800 nm without being subject to heat treatment, photo irradiation, or stretching. However, in certain embodiments these processes may be used to further enhance positive birefringence. In preferred embodiments, the compensation films may have birefringence greater than 0.005, 0.01, 0.02 or 0.03 throughout the wavelength range of 400 nm<$\lambda$<800 mm.

Birefringence ($\Delta n$) may be measured by determining the birefringence of a film over a wavelength range of about 300 nm to about 800 nm at different increments. Alternatively, birefringence of a film may be measured at 633 mm as is customary in the art. Reference to $\Delta n$ at 633 mm is customary because birefringence at wavelengths <633 nm is generally higher than birefringence at 633 nm, and birefringence at wavelengths >633 nm is generally the same as or slightly lower than birefringence at 633 nm. Thus, birefringence at 633 mm is understood in the art as indicating that birefringence throughout 300 nm<$\lambda$<800 nm is greater than or approximately the same as the birefringence at 633 nm.

In one example embodiment of the invention, the OASU is a disk. The disk may be attached directly to the polymer backbone through one covalent bond so the moiety has the general formula:

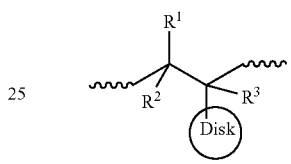

in the polymer backbone, wherein $R^1$, $R^2$, and $R^3$ are each independently hydrogen atoms, alkyl groups, substituted alkyl groups, or halogens. The disk may also be attached directly to the polymer backbone through two independent covalent bonds. The covalent bond may be a carbon-carbon or carbon-nitrogen bond. For example, disks may be attached to the polymer backbone via a carbon or nitrogen atoms, such as the carbon atom on a benzene ring or the nitrogen atom on an imide or lactam. The disk-containing polymer has a positive birefringence greater than 0.002 throughout the wavelength range of 400 nm<$\lambda$<800 nm without being subject to heat treatment, photo irradiation, or stretching. The disk-containing polymer film may be made by solution casting, and may form an out-of-plane anisotropic alignment upon solvent evaporation. In a preferred embodiment, the positive birefringence is greater than about 0.005 throughout the wavelength range of 400 nm<$\lambda$<800 nm.

The polymer film may be a homopolymer or copolymer with one or more moieties containing a disk attached directly to the polymer backbone through at least one covalent bond. The copolymer may have a moiety with the general structure in the polymer backbone:

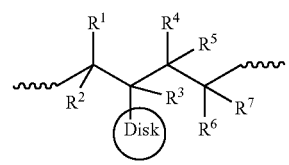

wherein $R^1$, $R^2$, $R^3$, $R^4$, $R^5$, and $R^7$ are each independently hydrogen atoms, alkyl groups, substituted alkyl groups, or halogens; wherein $R^6$ is a hydrogen atom, alkyl group, substituted alkyl group, halogen, ester, amide, ketone, ether, cyano, phenyl, epoxy, urethane, urea, or optically anisotropic subunit (OASU) attached directly to the backbone of a residue of an ethylenically unsaturated monomer. In one embodiment, $R^6$ is a different disk. In another embodiment, $R^6$ is a benzene ring. The disk may also be attached to a copolymer backbone by two covalent bonds.

The disk is usually a size greater than a benzene ring. The disk is usually bulky. In one embodiment, the disk group has a fused ring structure. The "fused ring" structure may be understood to have two or more individual rings that are connected by sharing at least one of their sides. Each individual ring in the fused ring may be substituted or unsubstituted and is preferably a six- or five-membered ring, which may be all-carbon or heterocyclic. Individual rings in a fused ring may be aromatic or aliphatic. Preferred individual rings in a fused ring include, but are not limited to, aromatic rings and substituted aromatic rings, lactam ring and rings based on aromatic imide such as phthalimide and substituted phthalimide. The disk group is stable at ambient conditions and thus suitable for use in an optical compensation film for an LCD.

Representatives and illustrative examples of disk groups include, but are not limited to, naphthalene, anthracene, phenanthrene, naphthacene, pyrene, pentacene, phthalimide, and the like as shown in the following chemical structures:

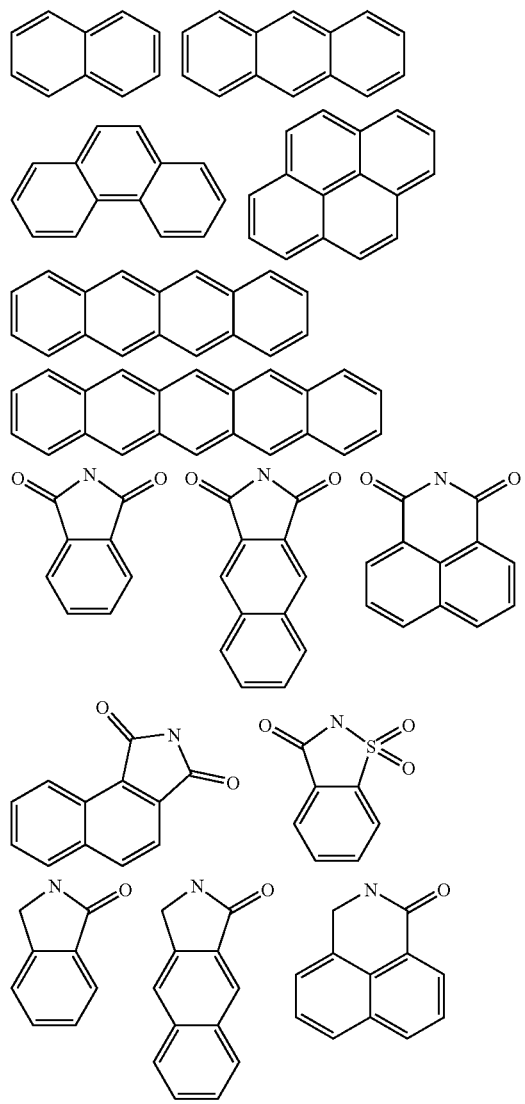

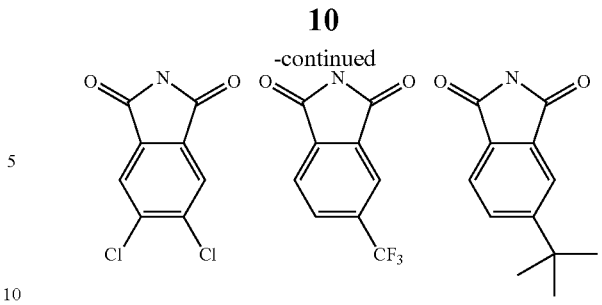

As one skilled in the art will recognize, polymer compositions comprising moieties with disk groups may be prepared by polymerization of a disk-containing monomer having a vinyl group attached directly to either a carbon or a nitrogen atom on the fused ring. Such disk-containing monomers with polymerizable vinyl groups include, but are not limited to, the following compounds:

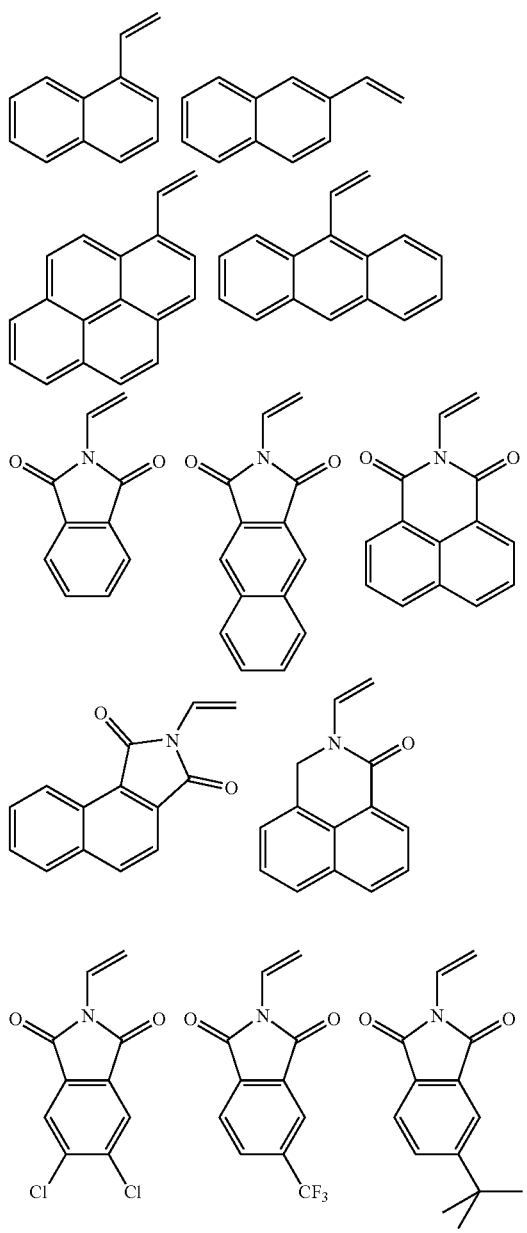

Polymer compositions comprising moieties with disk groups may also be prepared by copolymerization of a disk-containing monomer with one or more ethylenically unsaturated monomers. Such ethylenically unsaturated monomers that may be used to copolymerize with disk-containing monomers include, but are not limited to, one or more of methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethylopropyl triacrylate, styrene, α-methyl styrene, nitrostyrene, bromostyrene, iodostyrene, cyanostyrene, chlorostyrene, 4-t-butylstyrene, 4-methylstyrene, vinyl biphenyl, vinyl triphenyl, vinyl toluene, chloromethyl styrene, acrylic acid, methacrylic acid, itaconic acid, crotonic acid, maleic anhydride, glycidyl methacrylate, carbodiimide methacrylate, $C_1$-$C_{18}$ alkyl crotonates, di-n-butyl maleate, di-octylmaleate, allyl methacrylate, di-allyl maleate, di-allylmalonate, methyoxybutenyl methacrylate, isobornyl methacrylate, hydroxybutenyl methacrylate, hydroxyethyl(meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl (meth)acrylate, methacrylamide, acrylamide, butyl acrylamide, ethyl acrylamide, diacetoneacrylamide, butadiene, vinyl ester monomers, vinyl(meth)acrylates, isopropenyl (meth)acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, and monovinyl adipate t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamido-ethylethylene urea. Further monomers are described in The Brandon Associates, 2nd edition, 1992 Merrimack, N.H., and in Polymers and Monomers, the 1966-1997 Catalog from Polyscience, Inc., Warrington, Pa., U.S.A.

Polymerization may be carried out by a method known in the art such as bulk, solution, emulsion, or suspension polymerization. The reaction may be free radical, cationic, anionic, zwitterionic, Ziegler-Natta, or atom transfer radical type of polymerization. Emulsion polymerization is a preferred method of polymerization when a particularly high molecular weight is desirable. A high molecular weight polymer may lead to better film quality and higher positive birefringence.

Solution film casting may be done with disk containing polymer, a polymer solution comprising a blend of disk-containing polymer with other polymers, or a copolymer of disk-containing monomer with other monomers, the latter two being advantageous because they may improve film quality and lower cost. Polymer solutions may further contain other ingredients such as other polymers or additives.

Depending on the particular disk structure and polymer or polymer blend composition, the disk-containing polymers may be soluble in, for example, toluene, methyl isobutyl ketone (MIBK), methyl ethyl ketone (MEK), cyclopentanone, N,N-dimethylformamide, or mixtures thereof. Preferred solvents are toluene and MIBK.

In another example embodiment of the invention, the OASU is an aromatic ring (Ar) substituted with birefringence enhancing substituents (BES). BES could also be substituents on disk or mesogen OASUs. The Ar-BES may also be a fused aromatic ring substituted with BES. The Ar-BES may be attached directly to the polymer backbone through one covalent bond so the moiety has the general formula:

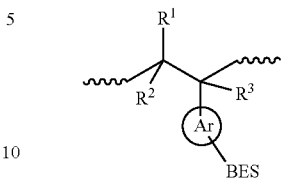

in the polymer backbone, wherein $R^1$, $R^2$, and $R^3$ are each independently hydrogen atoms, alkyl groups, substituted alkyl groups, or halogens. The Ar-BES may also be attached directly to the polymer backbone through two independent covalent bonds. The degree of substitution of the aromatic ring with BES is at least 0.1, but it may also be higher. The covalent bond may be a carbon-carbon or carbon-nitrogen bond. The Ar-BES containing polymer has a positive birefringence greater than 0.002 throughout the wavelength range of 400 nm<λ<800 nm without being subject to heat treatment, photo irradiation, or stretching. The Ar-BES-containing polymer film may be made by solution casting, and may form an out-of-plane anisotropic alignment upon solvent evaporation. The Ar-BES preferably has a positive birefringence greater than 0.005, and more preferably has a positive birefringence greater than 0.01 throughout the wavelength range of 400 nm<λ<800 nm.

The polymer film may be a homopolymer or copolymer with one or more moieties containing an Ar-BES attached directly to the polymer backbone through one covalent bond. The copolymer may have a moiety with the general structure in the polymer backbone:

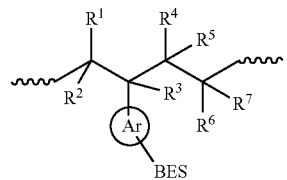

wherein $R^1$, $R^2$, $R^3$, $R^4$, $R^5$, and $R^7$ are each independently hydrogen atoms, alkyl groups, substituted alkyl groups, or halogens; wherein $R^6$ is a hydrogen atom, alkyl group, substituted alkyl group, halogen, ester, amide, ketone, ether, cyano, phenyl, epoxy, urethane, urea, or optically anisotropic subunit (OASU) attached directly to the backbone of the residue of an ethylenically unsaturated monomer. In one embodiment, $R^6$ is a different Ar-BES. In another embodiment, $R^6$ is a benzene ring.

The degree of substitution (DS) of BES on the aromatic ring refers to the average number of BES on one aromatic ring in a polymer composition. Thus, DS=1 when, on average, each aromatic ring is substituted with one BES. DS may also be greater than 1 when, on average, each aromatic ring is substituted with more than one BES. DS is preferably greater than 0.3, more preferably greater than 0.5, and most preferably greater than 0.7. The DS of BES is directly related to the polymer's birefringence. Thus, Δn may be manipulated by varying the DS. The solubility of the polymer can also be dependent on the DS and be optimized accordingly. The DS can be readily manipulated by one of ordinary skill in the art, for example, by adjusting the starting amounts of BES.

In one embodiment, the Ar-BES-containing polymer is a poly(vinylaromatic), i.e. a polymer resulting from polymerization of the vinyl group on an aromatic ring. The poly (vinylaromatic) also has at least one BES. Poly(vinylaromatic) with BES advantageously exhibits exceptionally high birefringence values, is soluble in a variety of organic solvents, and may be used to prepare an optical compensation film by solution casting onto a substrate. The solubility and birefringence of poly(vinyl aromatics) of the invention can be controlled by incorporating certain BESs and by adjusting their degree of substitutions (DSs) of the aromatic rings of the polymers. This is highly desirable since an LCD device typically contains multi-layers of materials having different solubility in a variety of solvents and a layer can only be coated with a polymer solution that does not dissolve this specific layer. Thus, the ability to control the solubility and birefringence of a polymer allows the optical film of the present invention to be cast on a specific layer (or substrate) for LCD fabrication to achieve the desirable order of the layers in the device.

Representatives and illustrative examples of aromatic groups include, but are not limited to, benzene, biphenyl, naphthalene, anthracene, phenanthrene, naphthacene, pyrene, pentacene, triphenyl, and the like. Preferably, the aromatic ring is benzene, biphenyl or naphthalene. Most preferably, the aromatic ring is benzene.

BES is a group that in general is bulky and/or capable of increasing the polarizability of the disk groups' aromatic ring on poly(vinyl aromatic). A polymer may contain different BES groups on different aromatic rings within the same polymer molecule or different BES groups on the same aromatic ring. Representatives and illustrative examples of BES include, but are not limited to, $NO_2$, Br, I, CN, and phenyl. Preferably, BES substituents are $NO_2$, Br, I, and CN. Most preferably, BES is $NO_2$ or Br.

BES may be attached to an aromatic ring such as benzene at any available position including the positions that are para, ortho or meta to the ethylene moiety. A polymer composition may also have BESs that are in different positions on different aromatic rings. In a preferred embodiment, the BES is para to the ethylene moiety. BES may also be mostly at the para position with some BES at the ortho and/or meta positions.

Representatives and illustrative examples of polymer compositions of BES-substituted aromatic polymers include, but are not limited to, poly(nitrostyrene), poly(bromostyrene), substituted poly(nitrostyrene), substituted poly(bromostyrene), copolymers of nitrostyrene or bromostyrene, and copolymer of substituted nitrostyrene or bromostyrene. Preferably, the polymer composition is poly(nitrostyrene), poly(bromostyrene), a copolymer thereof, or a mixture thereof.

Poly(nitrostyrene), poly(bromostyrene) and copolymers thereof may be substituted with one or more nitro or bromo BESs, respectively. The degree of substitution for bromo or nitro BES is preferably at least 0.5 and more preferrably at least 0.7. However, the degree of substitution may also be higher or lower in the range 0<DS<1. Also, DS may be greater than one. The nitro or bromo substituent may be attached to the benzene ring at any available position including the positions that are para, ortho or meta to the ethylene moiety. In a preferred embodiment, the nitro or bromo BES is para to the ethylene moiety. Thus, preferred polymers include poly(4-nitrostyrene), poly(4-nitrostyrene-co-styrene), poly(4-bromostyrene) and poly(4-bromostyrene-co-styrene). As one of skill in the art will recognize, when these preferred polymers are prepared from 4-nitro- or 4-bromostyrene monomers, the nitro or bromo groups, respectively, will always be at the para position.

As one of skill in the art will recognize, poly(nitrostyrene) may be prepared by nitration of polystyrene in the presence of a mixed acid of $HNO_3$ and $H_2SO_4$ as disclosed in Philippides, A., et al., *Polymer* (1993), 34(16), 3509-13; Fernandez, M. J., et al., *Polymer Degradation and Stability* (1998), 60(2-3), 257-263; Cowie, J. M. G., et al., *European Polymer Journal* (1992), 28(2), 145-8; and Al-Najjar, Mohammed M, et al., *Polymer Engineering and Science* (1996), 36(16), 2083-2087. Nitration of polystyrene can be carried out in the presence of an organic solvent such as nitrobenzene, 1,2-dichloroethane, 3-nitrotoluene, carbon tetrachloride, chloroform, methylene chloride, carbon disulfide, N,N-dimethylformamide, N,N-dimethylacetamide, N-methylpyrolidone, or a mixture thereof. Preferred solvents are nitrobenzene and a 3:1 mixture of nitrobenzene and 1,2-dichloroethane. Copolymers of nitrostyrene may be prepared by nitration of a copolymer of styrene such as poly(styrene-co-acrylonitrile), poly(styrene-co-4-t-butylstyrene), and poly(styrene-co-methyl methacrylate). They can also be prepared by copolymerization of nitrostyrene with other ethylenically unsaturated monomers such as methyl methacrylate, acrylonitrile, 4-t-butylstyrene, 4-methylstyrene, butyl acrylate, and acrylic acid. Poly(nitrostyrene) can also be prepared by polymerization of nitrostyrene monomer as disclosed in Philippides, A. et al., Polymer (1994), 35(8), 1759-63; and Jonquieres, A. et al., *Polymer Bulletin (Berlin)*, (1994), 33(4), 389-95. Trifluoroacetic anhydride and trifluoroacetic acid may be used with nitric acid as the nitration agent. Inorganic nitrate salts such as $NH_4NO_3$, $NaNO_3$, $KNO_3$, and $AgNO_3$ may also be used with trifluoroacetic anhydride as the nitration agent as disclosed in Grivello, J. V., *J. Org. Chem.* (1981), 46, 3056-3060.

The poly(nitrostyrene) polymers prepared in this invention are soluble in toluene, methyl isobutyl ketone (MIBK), methyl ethyl ketone (MEK), cyclopentanone, N,N-dimethylformamide or a mixture thereof depending on the degree of substitution of the nitro group. Preferred solvents for film casting poly(nitrostyrene) are toluene and MIBK or a mixture thereof.

As one of skill in the art will recognize, poly(bromostyrene) may be prepared by bromination of polystyrene in the presence of bromine and a Lewis acid catalyst such as $AlCl_3$, $FeCl_3$, $AlBr_3$, $FeBr_3$, $SbCl_5$, $ZrCl_4$, $Sb_2O_3$, and the like, as disclosed in U.S. Pat. Nos. 5,677,390 and 5,532,322, which are incorporated by reference in their entirety. It may also be prepared by reaction of polystyrene with n-butyllithium-TMEDA complex followed by bromine quenching as disclosed in Farrall, M. J. and Frechet, M. J., *Macromolecules*, Vol. 12; p. 426, (1979). Similar to poly(nitrostyrene), poly (bromostyrene) may also be prepared by polymerization of bromostyrene monomer as described in Farrall, M. J. and Frechet, M. J., *Macromolecules*, Vol. 12; p. 426, (1979). Likewise, copolymers of bromostyrene may also be prepared as described previously for poly(nitrostyrene). Bromination of polystyrene can be carried out in the presence of an organic solvent such as, for example, 1,2-dichloroethane, nitrobenzene, 3-nitrotoluene, carbon tetrachloride, chloroform, methylene chloride, carbon disulfide, N,N-dimethylformamide, N,N-dimethylacetamide, N-methylpyrrolidone, or a mixture thereof. Preferred solvents are 1,2-dichloroethane, carbon tetrachloride, and chloroform.

The poly(bromostyrene) polymers prepared in this invention are soluble in toluene as well as in cyclopentanone even with high degrees of substitution. This is particularly useful for coating a TAC substrate since toluene will not have a detrimental effect on the TAC film.

Polymer compositions comprising moieties with Ar-BES may also be prepared by copolymerization of an Ar-BEScontaining monomer with one or more ethylenically unsaturated monomers. Such ethylenically unsaturated monomers that may be used to copolymerize with disk-containing monomers include, but are not limited to, one or more of methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethyolpropyl triacrylate, styrene, α-methyl styrene, chlorostyrene, 4-t-butylstyrene, 4-methyl styrene, vinyl naphthalene, vinyl toluene, chloromethyl styrene, acrylic acid, methacrylic acid, itaconic acid, crotonic acid, maleic anhydride, glycidyl methacrylate, carbodiimide methacrylate, $C_1$-$C_{18}$ alkyl crotonates, di-n-butyl maleate, di-octylmaleate, allyl methacrylate, di-allyl maleate, di-allylmalonate, methyoxybutenyl methacrylate, isobornyl methacrylate, hydroxybutenyl methacrylate, hydroxyethyl (meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl(meth)acrylate, methacrylamide, acrylamide, butyl acrylamide, ethyl acrylamide, diacetoneacrylamide, butadiene, vinyl ester monomers, vinyl(meth)acrylates, isopropenyl(meth)acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, and monovinyl adipate t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamidoethylethylene urea. Further monomers are described in The Brandon Associates, 2nd edition, 1992 Merrimack, N.H., and in Polymers and Monomers, the 1966-1997 Catalog from Polyscience, Inc., Warrington, Pa., U.S.A.

Polymerization may be carried out by a method known in the art such as bulk, solution, emulsion, or suspension polymerization. The reaction may be free radical, cationic, anionic, zwitterionic, Ziegler-Natta, or atom transfer radical type of polymerization. Emulsion polymerization is a preferred method of polymerization when a particularly high polymer molecular weight is desirable. A high molecular weight polymer may lead to better film quality and higher positive birefringence.

Solution film casting may be done with Ar-BES containing polymer, a polymer solution comprising a blend of Ar-BES-containing polymer with other polymers, or a copolymer of Ar-BES containing monomer with other monomers, the latter two being advantageous because they may improve film quality and lower cost. Polymer solutions may further contain other ingredients such as other polymers or additives.

Depending on the particular Ar-BES structure and polymer or polymer blend composition, the Ar-BES-containing polymers may be soluble in, for example, toluene, methyl isobutyl ketone (MIBK), methyl ethyl ketone (MEK), cyclopentanone, N,N-dimethylformamide, or mixtures thereof. Preferred solvents are toluene and MIBK.

In another example embodiment of the invention, the OASU is rod-like. In a preferred embodiment, the rod-like structure is a mesogen. The mesogen may be attached directly to the polymer backbone through one covalent bond (without a spacer) so the moiety has the general formula:

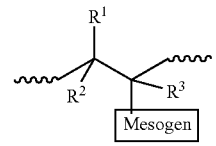

in the polymer backbone, wherein $R^1$, $R^2$, and $R^3$ are each independently hydrogen atoms, alkyl groups, substituted alkyl groups, or halogens. The mesogen may also be attached directly to the polymer backbone through two independent covalent bonds. The covalent bond may be a carbon-carbon or carbon-nitrogen bond. The mesogen is attached to the polymer backbone preferably at the gravity center of the mesogen or a nearby position, but may also be attached at an end or off-center position. The mesogen-containing polymer has a positive birefringence greater than 0.002 throughout the wavelength range of 400 nm<λ<800 nm without being subject to heat treatment, photo irradiation, or stretching. The mesogen-containing polymer film may be made by solution casting and may form an out-of-plane anisotropic alignment upon solvent evaporation. In a preferred embodiment, the positive birefringence is greater than 0.005, greater than 0.01, greater than 0.02 or greater than 0.03 throughout the wavelength range of 400 nm<λ<800 nm. The mesogen-containing polymers in the present invention are commonly referred to as mesogen jacketed polymers (MJPs). MJPs according to the invention include conventional mesogen-jacketed liquid crystalline polymers (MJLCPs) as well as polymers that are jacketed by a non-liquid crystalline rod-like group.

The polymer film may be a homopolymer or copolymer with one or more moieties containing a mesogen attached directly to the polymer backbone through at least one covalent bond. The copolymer may have a moiety with the general structure in the polymer backbone:

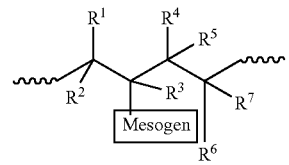

wherein $R^1$, $R^2$, $R^3$, $R^4$, $R^5$, and $R^7$ are each independently hydrogen atoms, alkyl groups, substituted alkyl groups, or halogens; wherein $R^6$ is a hydrogen atom, alkyl group, substituted alkyl group, halogen, ester, amide, ketone, ether, cyano, phenyl, epoxy, urethane, urea, or optically anisotropic subunit (OASU) attached directly to the backbone of the residue of an ethylenically unsaturated monomer. In one embodiment, $R^6$ is a different mesogen. The mesogen may also be attached to a copolymer backbone by two covalent bonds.

Unlike conventional side-chain liquid crystalline polymers (LCPs) having flexible spacers between the backbones and the mesogens, mesogen-jacked polymers (MJPs) have no or very short spacers between the polymer backbones and the rod-like mesogenic units. See Zhao, Y. F., et al. *Macromolecules,* 2006, 39, p. 948. Thus, MJPs have a strong interaction between the main chains and the bulky side groups. As a result, unlike the conventional side-chain LCPs whose backbones usually take a random-coil chain conformation, MJPs are somewhat rigid and exhibit some characteristics of main-chain LCPs.

It has been surprisingly found that MJPs having no spacers between the backbones and the rod-like mesogenic side groups are capable of forming out-of-plane anisotropically aligned films without being subject to either heat treatment or photo irradiation. An embodiment of the invention includes preparing such films by solution casting. Upon solvent evaporation at an ambient temperature, the resulting films exhibit exceptionally high positive birefringence. MJPs of the invention are soluble in a variety of organic solvents.

Mesogens of the invention may have the general formula:

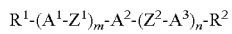

wherein,
$A^1$, $A^2$, and $A^3$ are independently either aromatic or cycloaliphatic rings. The rings may be all carbons or heterocyclic and may be unsubstituted or mono- or poly-substituted with halogen, cyano or nitro, or alkyl, alkoxy, or alkanoyl groups having 1 to 8 carbon atoms. $Z^1$, $Z^2$, and $Z^3$ are each independently —COO—, —OOC—, —CO—, —CONH—, —NHCO—, —CH=CH—, —C≡C—, —CH=N—, —N=CH—, —N=N—, —O—, —S—, or a single bond. $R^1$ and $R^2$ are each independently halogen, cyano, or nitro groups, or alkyl, alkoxy, or alkanoyl groups having 1 to 25 carbon atoms, or has one of the meanings given for -($Z^2$-$A^3$). m is 0, 1, or 2; n is 1 or 2. Preferably, m is 1 or 2; n is 1 or 2; $A^2$ is 1,4-phenylene; and the mesogen is attached to the polymer backbone through $A^2$. More preferably, m is 2; n is 2; $A^2$ is 1,4-phenylene; and the mesogen is attached to the polymer backbone through $A^2$.

Representatives and illustrative examples of aromatic rings in a mesogen include, but are not limited to:

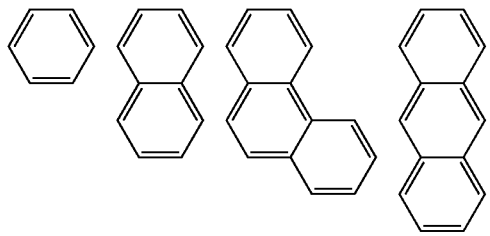

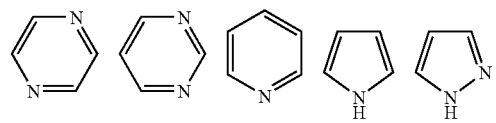

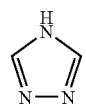

Representatives and illustrative examples of cycloaliphatic rings in a mesogen include, but are not limited to:

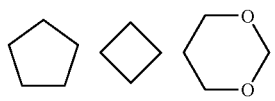

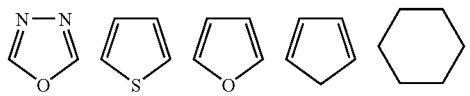

Representatives and illustrative examples of mesogens that may be attached to the polymer backbone through one covalent bond include, but are not limited to:

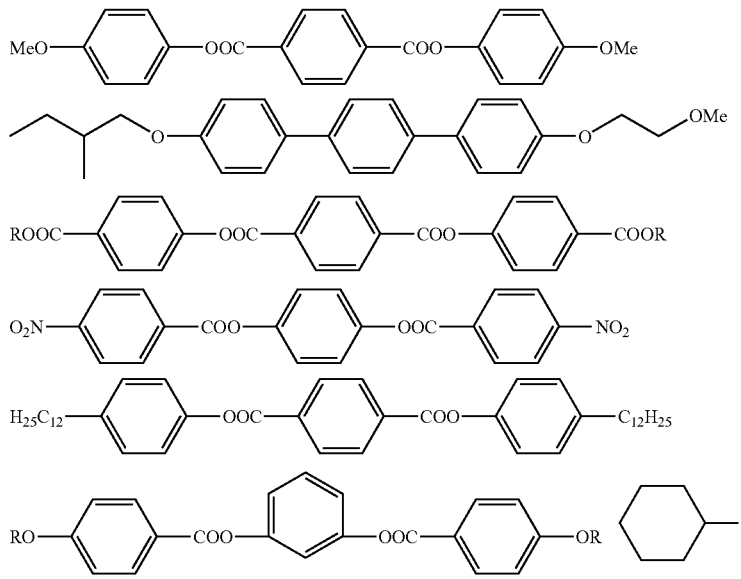

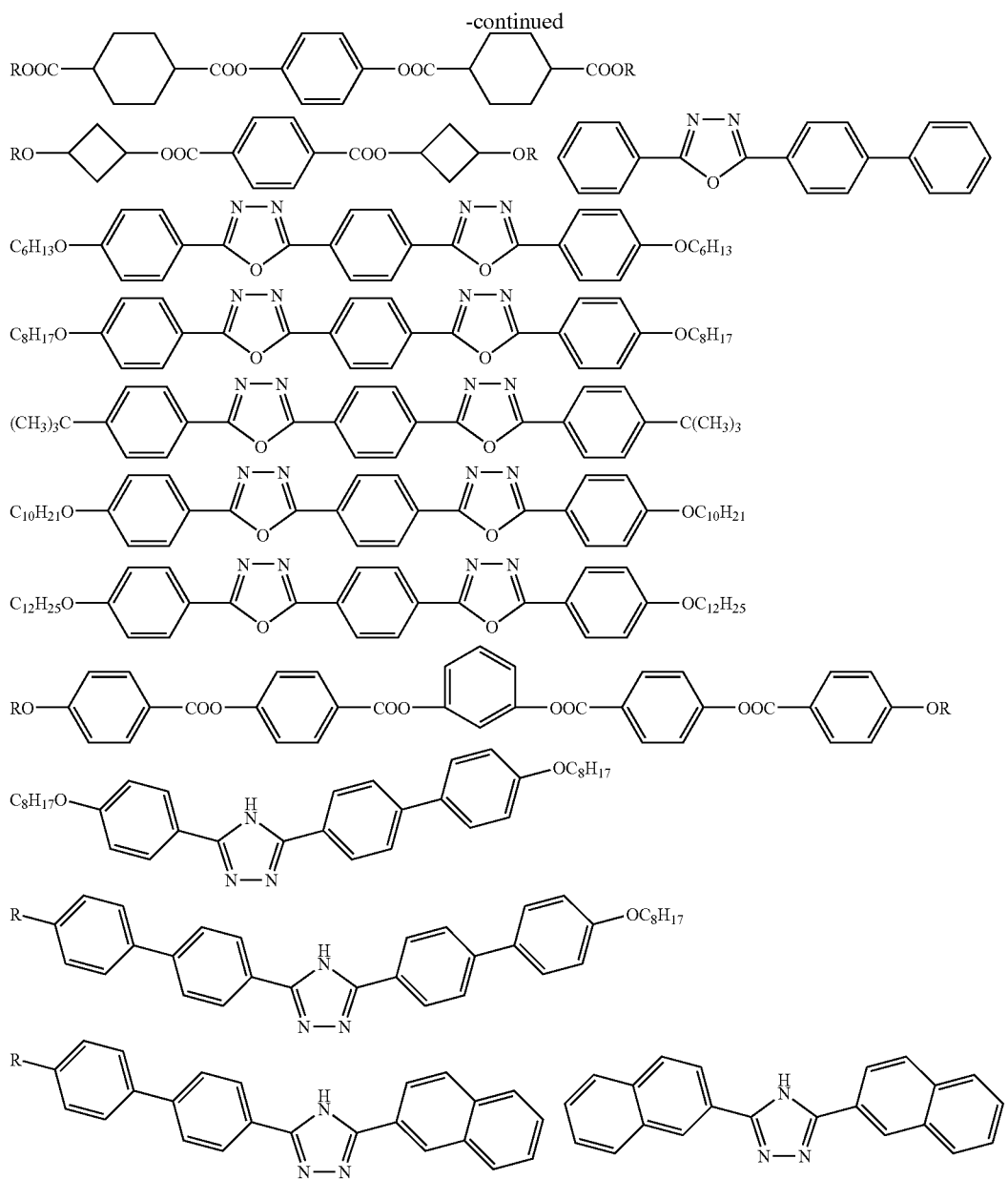

Such mesogens may be attached to the polymer backbone via a carbon atom on a benzene ring or a nitrogen atom on a triazole. In a preferred embodiment, the mesogen is attached to the polymer backbone via a carbon atom on the center 1,4-phenylene or a nitrogen atom on the heterocyclic ring.

Representatives and illustrative examples of preferred polymer moieties with mesogens having m is 1 or 2, n is 1 or 2, $A^2$ is 1,4-phenylene, and the mesogen is attached to the polymer backbone through $A^2$ include, but are not limited to:

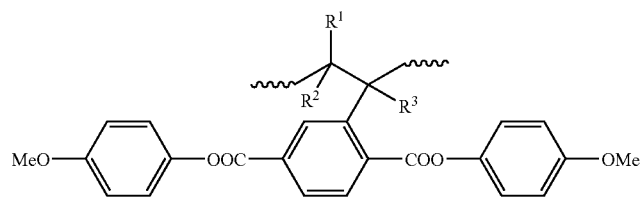

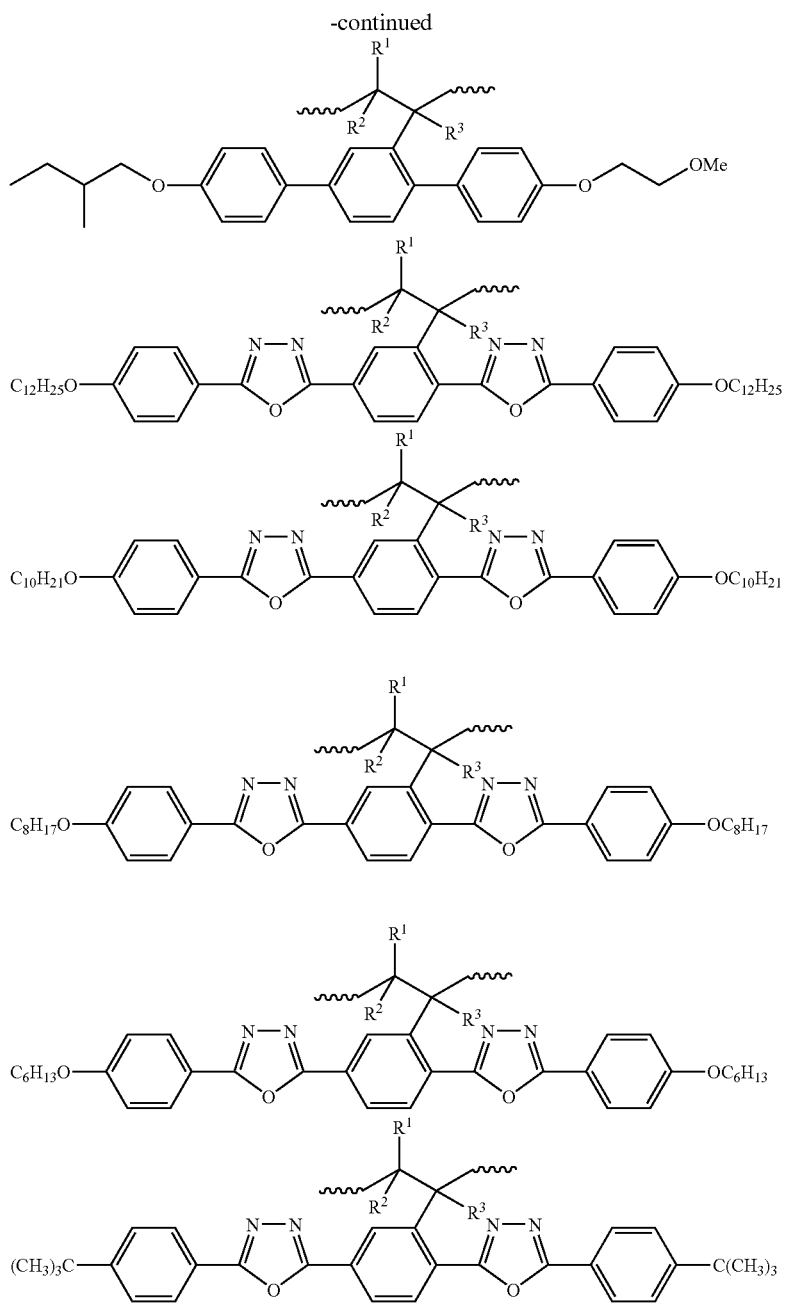
Representatives and illustrative examples of preferred polymer moieties with mesogens having m is 2, n is 2, A² is 1,4-phenylene, and the mesogen is attached to the polymer backbone through A² include, but are not limited to:
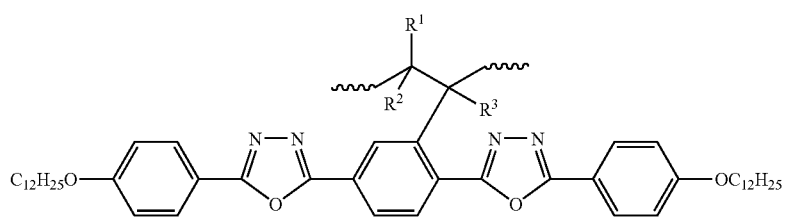

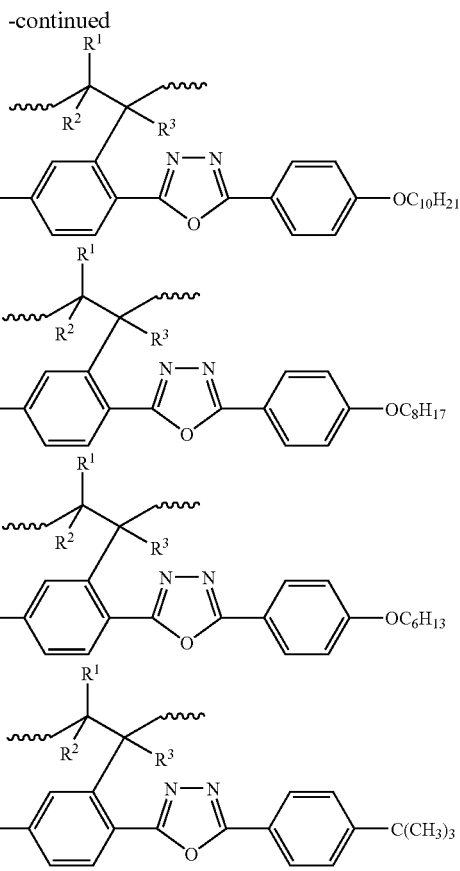

wherein R¹, R², and R³ are hydrogen atoms, alkyl groups, or halogens.

In one example embodiment of the invention, an optical film is solution cast from polymer compositions with one or more moieties of a mesogen having m is 2, n is 2, A² is 1,4-phenylene, and being attached to the polymer backbone through A² This mesogen-jacketed polymer film has an absorption maxima between the wavelengths of about 300 nm and about 350 nm and a positive birefringence greater than about 0.015 throughout 400 nm<$\lambda \leq$800 nm. Representative and illustrative examples of such polymer moieties include, but are not limited to:

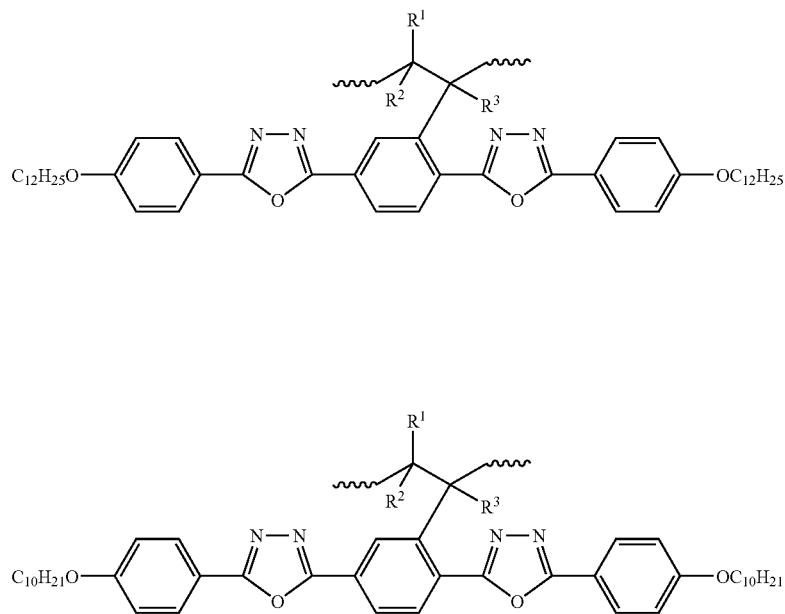

-continued

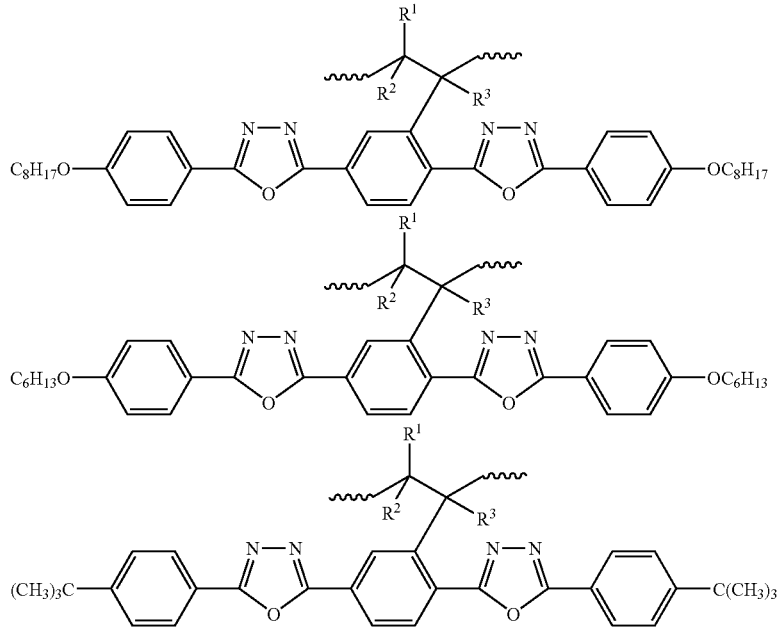

wherein $R^1$, $R^2$, and $R^3$ are hydrogen atoms, alkyl groups, or halogens.

MJPs of the invention may be prepared by polymerization of a mesogen monomer having a vinyl group attached to one of its rings, preferably an aromatic ring such as benzene. The polymerization may be carried out by a method known in the art such as bulk, solution, emulsion, or suspension polymerization. The reaction may be free radical, cationic, anionic, zwitterionic, Ziegler-Natta, or atom transfer radical type of polymerization. See Zhou, Q. F., et al. *Macromolecules,* 1987, 20, p. 233; Zhang, D., et al., *Macromolecules,* 1999, 32, p. 5183; Zhang, D., et al., *Macromolecule,* 1999, 32, p. 4494; and Chen, X., et al., *Macromolecules,* 2006, 39, p. 517.

Representatives and illustrative examples of mesogen monomers with polymerizable vinyl groups suitable for the invention include, but are not limited to:

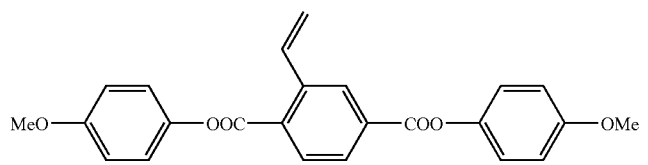

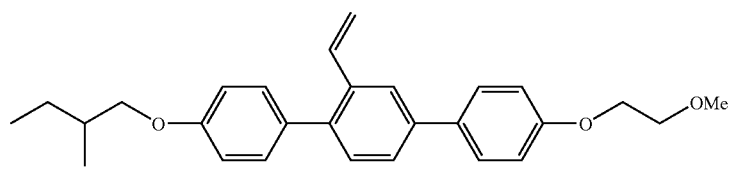

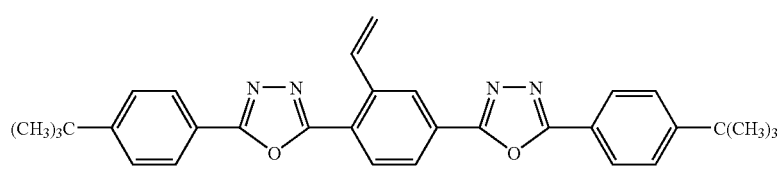

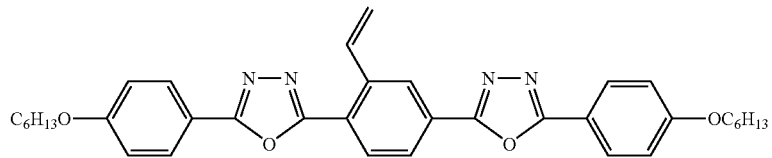

-continued
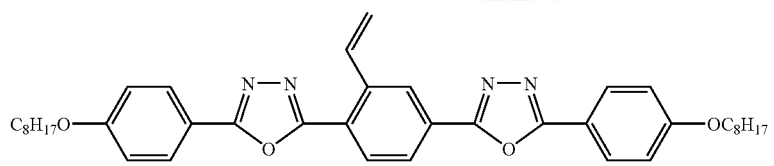
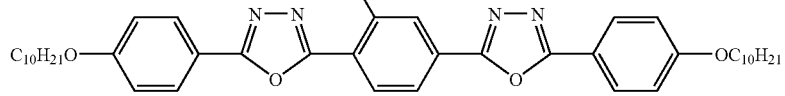
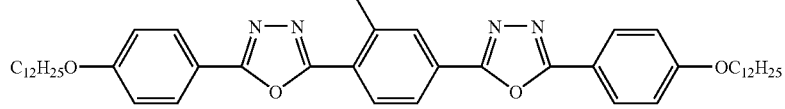
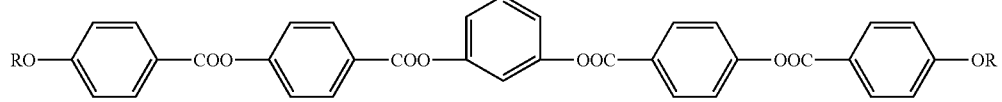
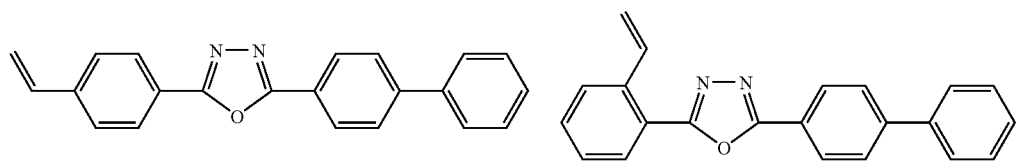
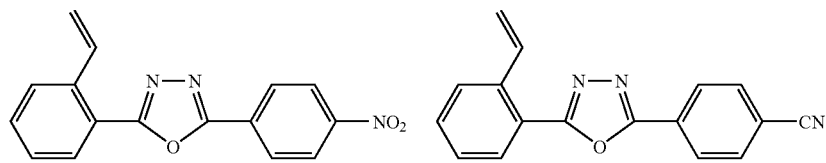
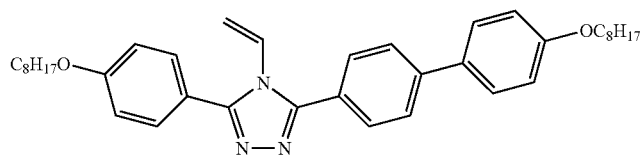
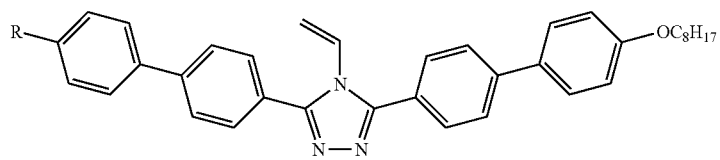
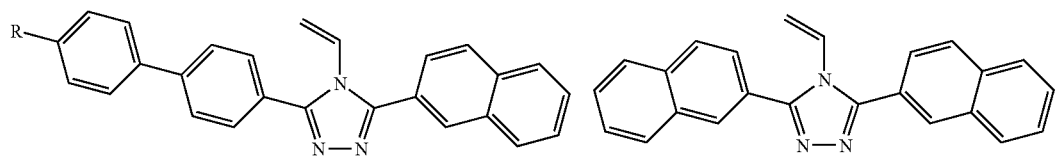

Representatives and illustrative examples of preferred mesogen monomers with polymerizable vinyl groups suitable for the invention include, but are not limited to:

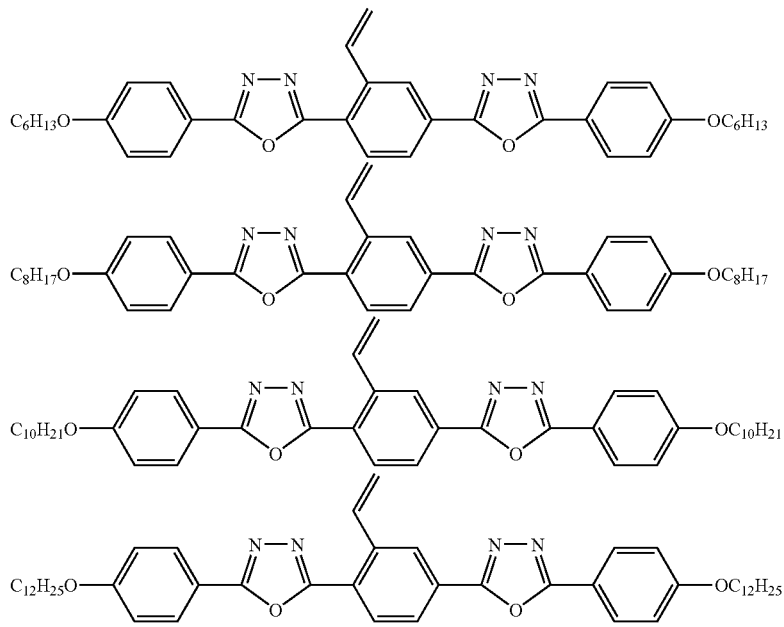

Polymers with these moieties have a positive birefringence greater than about 0.02 throughout the wavelength range of 400 nm<λ<800 nm.

MJPs of the present invention may also be prepared by copolymerization of a mesogen monomer having one vinyl group with one or more ethylenically unsaturated monomers. Representatives and illustrative examples of ethylenically unsaturated monomers that may be used for copolymerization with mesogen-containing monomers include, but are not limited to, one or more of methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethyolpropyl triacrylate, styrene, α-methyl styrene, vinyl naphthalene, nitrostyrene, bromostyrene, iodostyrene, cyanostyrene, chlorostyrene, 4-t-butylstyrene, vinyl biphenyl, vinyl triphenyl, vinyl toluene, chloromethyl styrene, acrylic acid, methacrylic acid, itaconic acid, crotonic acid, maleic anhydride, glycidyl methacrylate, carbodiimide methacrylate, $C_1$-$C_{18}$ alkyl crotonates, di-n-butyl maleate, α- or β-vinyl naphthalene, di-octylmaleate, allyl methacrylate, di-allyl maleate, di-allylmalonate, methyoxybutenyl methacrylate, isobornyl methacrylate, hydroxybutenyl methacrylate, hydroxyethyl(meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl(meth) acrylate, methacrylamide, acrylamide, butyl acrylamide, ethyl acrylamide, diacetoneacrylamide, butadiene, vinyl ester monomers, vinyl(meth)acrylates, isopropenyl(meth) acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, and monovinyl adipate t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamido-ethylethylene urea. Further monomers are described in The Brandon Associates, 2nd edition, 1992 Merrimack, N.H., and in Polymers and Monomers, the 1966-1997 Catalog from Polyscience, Inc., Warrington, Pa., U.S.A.

As one of skill in the art will recognize, MJP may also be prepared by first synthesizing a functionalized polymer and then subsequently reacting the polymer with a small molecule to obtain the desired mesogen structure.

Solution film casting may be done with MJPs, a polymer solution comprising a blend of MJPs with other polymers, or a copolymer of MJPs, the latter two being advantageous because they may improve film quality and lower cost. Polymer solutions may further contain other ingredients such as other polymers or additives. MJPs of the invention are soluble in toluene, methyl isobutyl ketone (MIBK), methyl ethyl ketone (MEK), cyclopentanone, N,N-dimethylformamide or a mixture thereof depending on the structures of the mesogens. Preferred solvents are toluene and MIBK. Optical films can be cast onto a substrate from the resulting polymer solutions by a method known in the art such as, for example, spin coating, as described above.

In another embodiment of the invention, the OASU is attached directly to the polymer backbone through two independent covalent bonds so the moiety has the general formula:

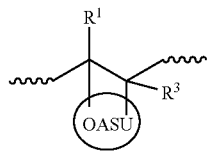

wherein $R^1$, $R^2$, and $R^3$ are each independently hydrogen atoms, alkyl groups, substituted alkyl groups, or halogens, and OASU is an optically anisotropic sub-unit.

Representatives and illustrative examples of such polymer moieties having OASU attached directly to the polymer backbone through two independent covalent bonds include, but are not limited to:

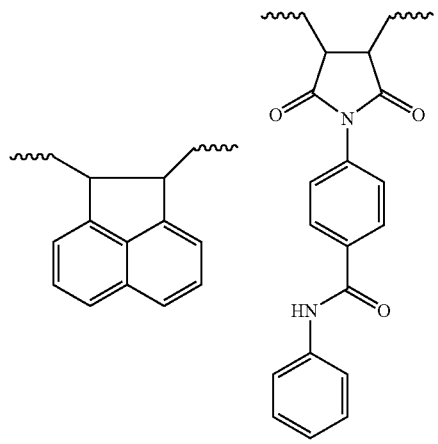

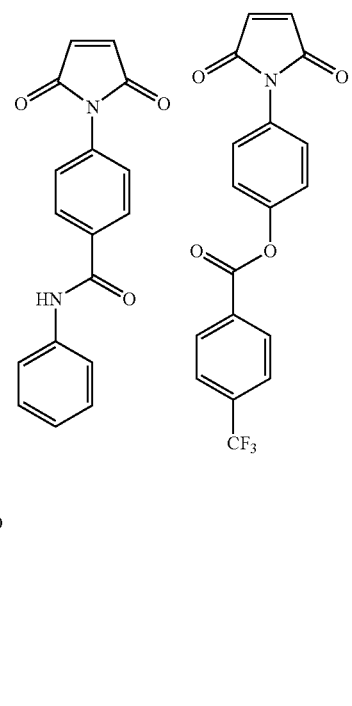

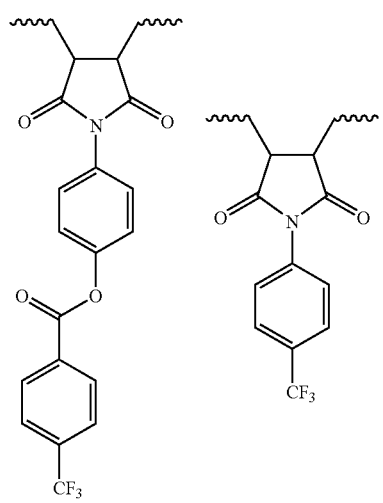

Representatives and illustrative examples of monomers that may be used to prepare homopolymers or copolymers having OASU attached directly to the polymer backbone through two independent covalent bonds include, but are not limited to:

Another example embodiment of the invention includes a method for controlling the birefringence of an optical compensation film by selecting a polymer that adheres to parameters that have been discovered to enhance birefringence as disclosed herein. Birefringence of a polymer film with positive birefringence (positive C-plate) may be controlled by controlling the orientation of optically anisotropic subunits (OASUs), which are the molecular units that give a compensation film its birefringent properties.

In a preferred example embodiment of the invention, birefringence may be controlled by selecting a polymer with substituents that exhibit the buttressing effect, defined as:

$$B=R/D$$

wherein B is the buttressing factor, R is the maximum dimension of an OASU in the direction perpendicular to the vector sum of the covalent bond or bonds that attach the OASU to the polymer backbone, and D is the distance along the polymer backbone, when the polymer backbone is in extended conformation, between the attaching points of the two neighboring OASUs. For an OASU attached to the polymer backbone by two covalent bonds, D is measured from the midpoint of the two covalent bonds. For a polymer with some moieties that do not contain OASUs, D is still the distance between attaching points of the two closest OASUs, even if the OASUs are not directly adjacent to each other or if other substituents are between the OASUs along the polymer chain. The buttressing factor B of a given polymer or copolymer structure may be calculated theoretically based on values of bond lengths and the corresponding distances between atoms or substituents. As will be understood by one of ordinary skill in the art, bond lengths may be calculated by techniques such as x-ray crystallography, X-ray-absorption fine structure, NMR spectroscopy and electron diffraction. Tables reporting known bond lengths are known in the art and available in various chemistry texts such as Handbook of Chemistry & Physics, $65^{th}$ Edition, CRC Press; Chemistry: the molecular nature of matter and change, $4^{th}$ edition, 2006, The McGraw- Hill Companies, Author: Martin S. Silberberg. In one example embodiment, selection of an OASU according to B=R/D parameters allows control of the negative segment birefringence ($\Delta n^s$) of a polymer film. That polymer is then solution cast so that it has a negative segment order parameter ($O^s$), thus resulting in a polymer film with positive birefringence ($\Delta n$).

Figure 1A:
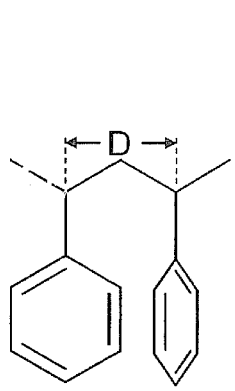
Figure 1B:
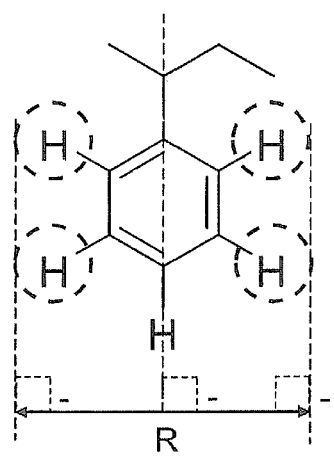
Figure 1C:
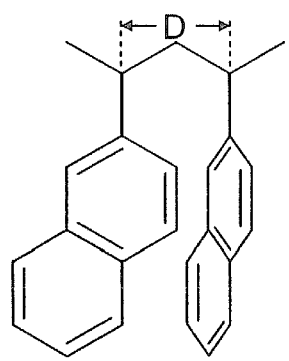
Figure 1D:
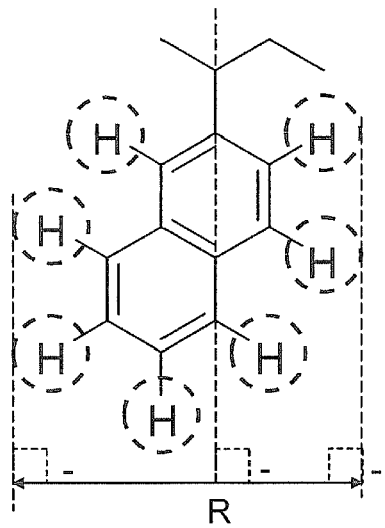
Figure 1E:
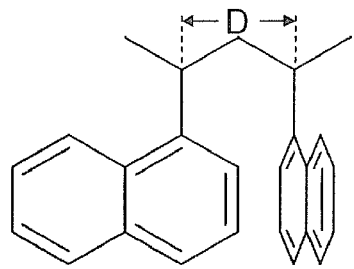
Figure 1F:
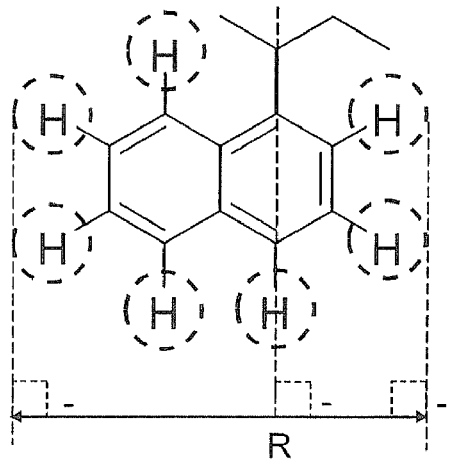
Figure 1G:
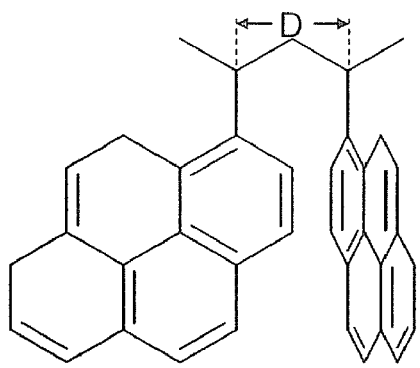
Figure 1H:
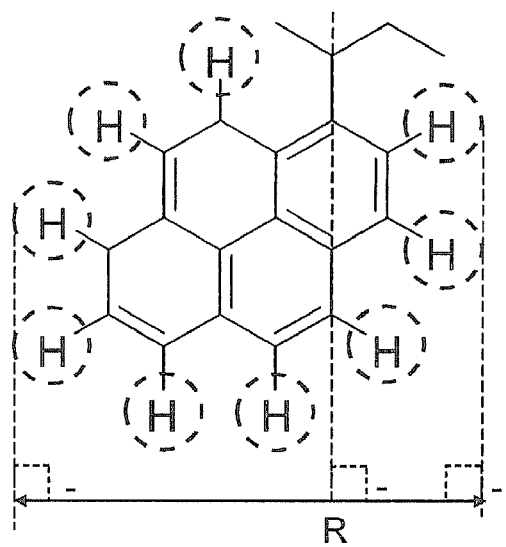
Figure 1I:
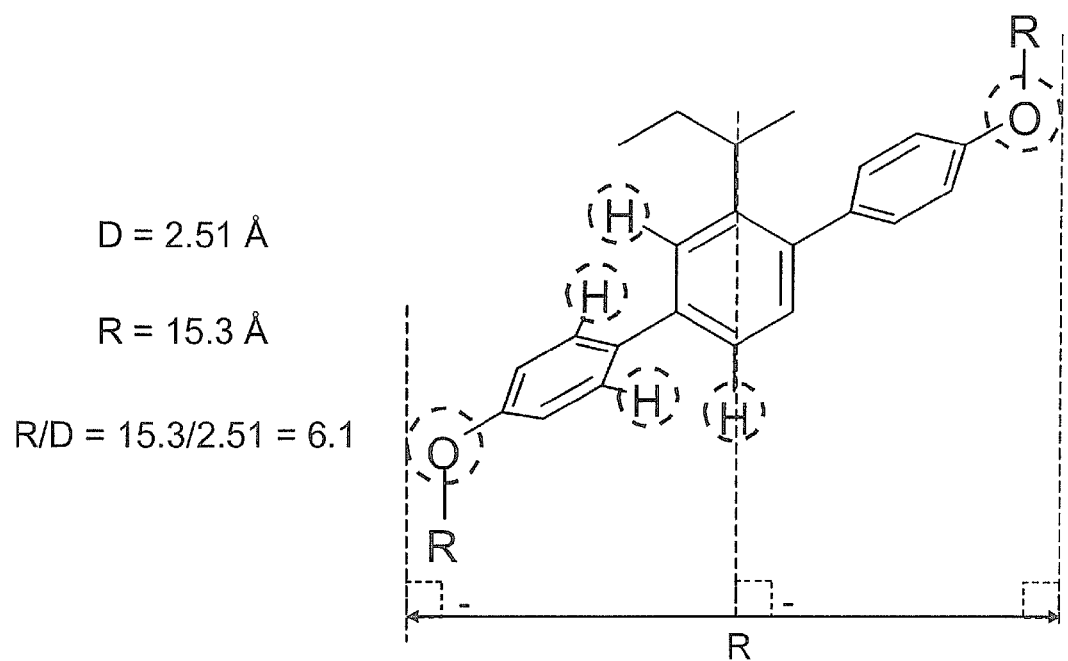
Figure 2:
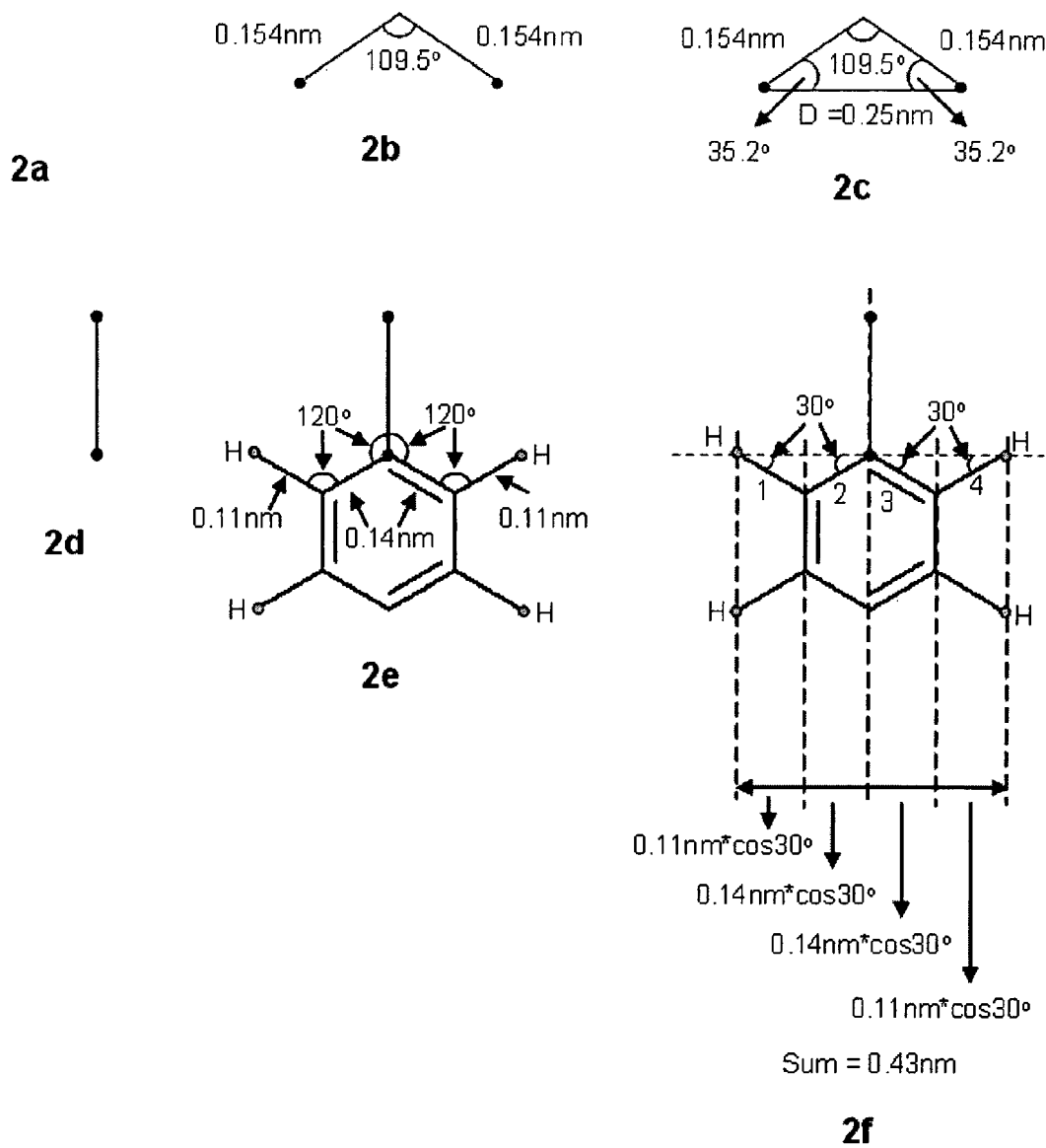

Theoretical calculation of R and D values may be understood by reference to an exemplary polymer, polystyrene, which is explained in FIGS. 1-2 and the following example. D is the distance between the attaching points of two OASUs to the polymer backbone when the polymer is in the extended chain conformation, as depicted in exemplary FIG. 1a. D is the straight line distance between the attaching points of neighboring OASUs rather than the entire distance along the polymer backbone between the attaching points. D may be calculated by drawing a framework around an OASU-containing moiety and using known bond lengths and bond angles.

Use of the framework, bond lengths and bond angles in calculating D and R is demonstrated by reference to polystyrene. FIG. 2a shows the point on the polymer backbone at which the OASU of reference (the benzene ring) will be attached. FIG. 2b shows a segment of the polymer backbone in the extended chain conformation. For polystyrene, this represents two single carbon-carbon bonds, each having a bond length of 0.154 nm and a bond angle of 109.5°. FIG. 2c shows the distance D formed when the two OASU-attaching points are joined by a straight line. The angles between the straight line representing D and the carbon-carbon singles bonds is readily determined [(180°−109.5°)÷2=35.2°]. Thus, the value of D may be calculated by $$D=(0.154\times\cos 35.2°)+(0.154\times\cos 35.2°)=0.25 \text{ nm}$$

Thus, for polystyrene shown in FIG. 1a, D is approximately 2.51 Å. Other examples of D calculations are depicted in FIGS. 1c, 1e, 1g, 3a-c and 4a-c and by Examples 23 and 24.

Turning now to FIG. 1b, R measures the size of an OASU in the direction perpendicular to its rigid bond to the polymer backbone. The OASU is drawn to scale in the plane of the paper according to its actual bond lengths and bond angles. R is measured by drawing lines flanking the OASU that are parallel to the covalent spacer bond and parallel to each other and determining the distance between the two outer lines using bond lengths and bond angles. That value is added to the van der waals radii of the left-most and right-most atoms of the OASU. This sum will be the value of R. This calculation is illustrated for the exemplary polymer polystyrene in FIG. 2d-f. FIG. 2d shows the covalent bond from a carbon atom of the polymer backbone to the attaching atom of the OASU. In the case of polystyrene, the attaching atom is also carbon. FIG. 2e shows the structure of benzene attached to the polymer backbone and its known bond lengths and bond angles. All carbon-carbon bond lengths of the benzene ring are 0.14 nm, all bond angles of the benzene ring are 120°, and all carbon-hydrogen bond lengths of the benzene ring are 0.11 nm. FIG. 2f shows the benzene ring with parallel vertical lines drawn at intervals such that calculating the distances of segments of the OASU is possible for each interval. One skilled in the art will know how to partition each structure so that calculating R is possible based on known bond lengths and bond angles. As shown in FIG. 2f, bonds 1, 2, 3 and 4 each have an angle of 30° with respect to the horizontal length of the benzene OASU, and thus each segment has a length calculated by bond length×cos 30°, and R is the sum of these segment lengths plus the van der waals radii of the hydrogen atoms, which are each 0.12 nm. Thus, R may be calculated by:

$$R=[2\times\cos 30°\times(d_{C-C}+d_{C-H})]+[2\times r_H]$$

$$R=2\times 0.866\times(1.4+1.1)+2\times 1.2$$

$$R=0.67 \text{ nm}$$

As one skilled in the art will recognize, this calculation may also be performed as:

$$R=(0.11 \text{ nm}\times\cos 30°)+(0.14 \text{ nm}\times\cos 30°)+(0.14 \text{ nm}\times\cos 30°)+(0.11 \text{ nm}\times\cos 30°)+2\times 0.12 \text{ nm}$$

$$R=0.67 \text{ nm}$$

Thus, for polystyrene shown in FIG. 1a, R is approximately 6.7 Å. Other examples of R calculations are depicted in FIGS. 1d, 1f, 1h, 1i, 3d-f and 4d-f and by Examples 23 and 24. If the OASU contains a flexible tail, such as the R group depicted at the end of the OASU in FIG. 1i, the bond distance and bond angle of the flexible tail (R group) is not included in the calculation of R. Further, for Ar-BES that are styrene substituted with a BES at the 4-position (the position that is opposite the attaching point of the Ar-BES to the polymer backbone), the R calculation will be the same as for styrene because the BES at the 4-position does not contribute to the dimension (R) of the Ar-BES and is thus not included in the calculation of R. Thus, the van der waals radii of the oxygen atoms in FIG. 1i are the right-most and left-most distances to be included in the R calculation.

It will be understood by those skilled in the art that the equation for calculating R may differ for different OASUs because it is dependent on the bond lengths and angles of the OASU. Thus, OASUs with different atoms or different conformations may use different equations to calculate R, but the equation will be based on the principals described herein.

Lastly, B is calculated by dividing R by D. Thus, for polystyrene:

$$B=R/D$$

$$B=6.7 \text{ Å}\div 2.51 \text{ Å}$$

$$B=2.7$$

The solution casting film of polystyrene (PS) has a birefringence around 0.002 in the visible light wavelength (~0.001-0.002 @ 633 nm).

The calculations for D and R described herein and as depicted in FIG. 1 may be applied to other polymers or copolymers and thus B may be calculated for other specific OASU-containing moieties.

Figure 3:
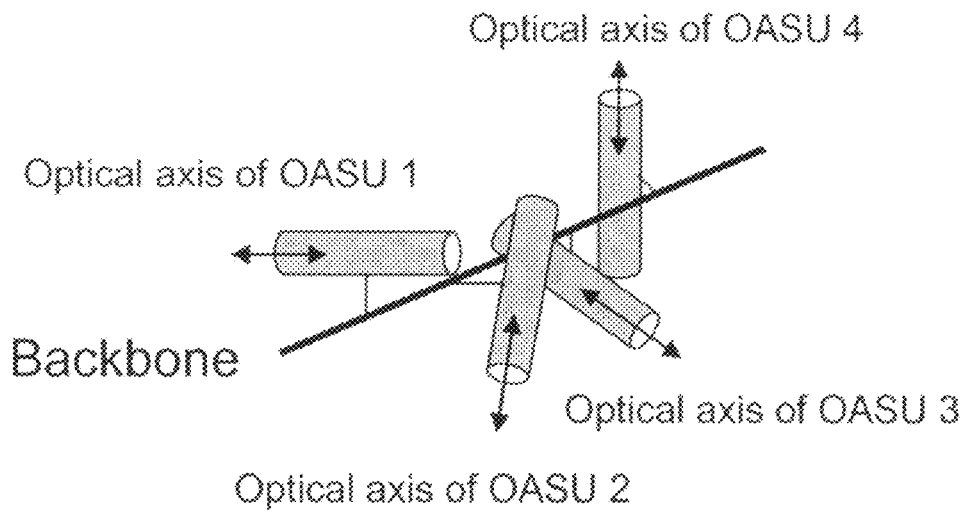
FIG. 3(a) is a side view depiction of a buttressed rod-like mesogen-jacketed polymer chain.
FIG. 3(b) is an end view depiction of a buttressed rod-like mesogen-jacketed polymer chain.
Figure 3:
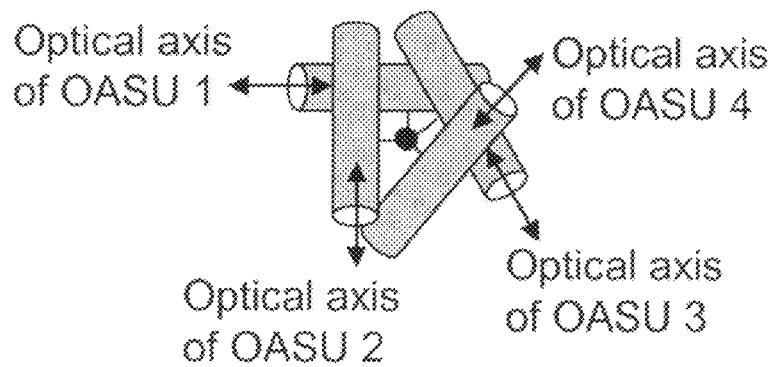

When the buttressing factor B is greater than about 2.5, the maximum dimension of an OASU is greater than its distance from another OASU in the direction perpendicular to the covalent bond that attaches the OASU to the polymer backbone. These optimal parameters cause the polymer backbone to twist into a corkscrew-like conformation such that the OASUs are oriented above and below the buttressed polymer chain, but not on the sides of the buttressed polymer chain, to accommodate the bulky OASUs in a sterically favorable conformation. The buttressed polymer chain is unable to unwind due to steric hindrance. The buttressing effect also causes the polymer backbone to have an overall linear shape (i.e., viewed from a distance) over a long distance. Thus, the buttressed polymer is rigidly fixed in the corkscrew-like conformation with OASUs extending above and below at angles that are approximately perpendicular to the overall linear direction of the buttressed polymer chain, as shown in FIG. 3. The higher the perpendicularity of the OASUs, the larger the negative segment birefringence ($\Delta n^s$) of the polymer segment. Thus, in a preferred embodiment of the invention, the butressing factor for an OASU is greater than about 2.5. In one embodiment the OASU is Ar-BES and the butressing factor may be at least about 2.6. In a more preferred embodiment, the buttressing factor for an OASU is at least about 2.7. In one embodiment, the OASU is a disk or a mesogen and the butressing factor may be at least about 2.7.

Polymer chain rigidity can be enhanced by increasing the buttressing factor, i.e. by increasing the dimension and/or decreasing the distance between OASUs. Thus, the buttressing factor may be increased depending on the desired chain rigidity, which affects the overall birefringence of a compensation film containing the buttressed polymer. Accordingly, it may be desirable to increase the buttressing factor to any higher value of B, such as for example 3, 4, 5, 6, 7, 8, 9, 10, 11, 12 or any increments between. However, higher values of B may also be contemplated depending on the particular application of the compensation film and its desired birefringence.

When the buttressed polymer backbone is in-plane (parallel to the substrate) and the OASUs are perpendicular to the substrate and the polymer backbones, the perpendicularity of the OASUs (the light-directing elements of the compensation film), allows the film to have an index of refraction in the direction perpendicular to the film (i.e., along the optical axis of the OASUs) that is higher than the index of refraction in the direction parallel to the film (i.e., along the length of the buttressed polymer's backbone. Thus, the compensation film satisfies the relation $n_\perp \gg n_\parallel$. Since the difference between $n_\perp$ and $n_\parallel$ is great, the birefringence $\Delta n$ of the compensation film is high.

High birefringence $\Delta n$ achieved through selecting a polymer with the buttressing effect is also desirable because it allows the thickness of the compensation film to be thinner since film birefringence and thickness vary inversely. The retardation value of an optical compensation film is defined as $d \times \Delta n$, wherein d is the thickness of the film. Thus, a film with high birefringence can be thinner and still achieve the desired retardation value. The retardation value of the optical compensation film may preferably be 50 nm to 400 nm.

As described herein, the OASU may be disk-like or rod-like. Birefringence of the compensation film may be controlled by manipulating the birefringence of a uniaxial unit, represented as $\Delta n^{OASU}$, wherein $\Delta n^{OASU} = n_o^{OASU} - n_e^{OASU}$. $\Delta n^{OASU}$ is greater than zero for rod-like OASUs because their optical axis is in the rod direction of OASU so $n_o^{OASU} > n_e^{OASU}$. $\Delta n^{OASU}$ is less than zero for disk-like OASUs because their optical axis is perpendicular to the plane of the OASU disk so $n_o^{OASU} < n_e^{OASU}$.

The order parameter of the OASU with respect to the film normal direction (z direction) is defined as $O^{OASU} = (3<\cos \theta> - 1)/2$, wherein $<\cos \theta>$ is the average value of all units' $\cos \theta$ value, and $\theta$ is the angle between the OASU's optical axis direction and the film's normal direction. According to the definition, $\theta$ is in the range from 0° to 90°, and $O^{OASU}$ is thus in the range from −0.5 to 1. Therefore, $O^{OASU}$ may be positive, negative, or zero.

Figure 4:
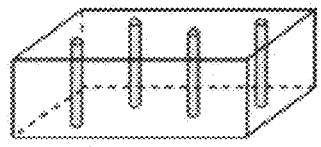
FIG. 4 is a table depicting $O^{OASU}$ and $\Delta n^{OASU}$ parameters for polymers with disk-like and rod-like OASUs.

A compensation film's birefringence can be expressed as a function of the birefringence and order parameter of a uniaxial unit: $\Delta n = \Delta n^{OASU} \times O^{OASU}$. Considering the sign of the two factors, there are 6 combinations as listed in FIG. 4. The invention pertains to positive C plates. Thus, as shown in FIG. 4, the rod-like OASU requires a positive order parameter ($O^{OASU} > 0$), whereas the disk-like OASU requires a negative order parameter ($O^{OASU} < 0$) to satisfy $\Delta n = \Delta n^{OASU} \times O^{OASU} > 0$.

During film formation and processing, the basic unit of the polymer may be defined as a rigid segment and the film's birefringence can be expressed as: $\Delta n = \Delta n^S \times O^S$, wherein $\Delta n^S$ is the birefringence of the segment, and $O^S$ is the order parameter of the segment with respect to the film's normal direction. The birefringence of the segment $\Delta n^S$ is defined as $\Delta n^S = n_o^S - n_e^S$, wherein $n_o^S$ is the refractive index along the segment direction (or the main chain direction at the segment position), and $n_e^S$ is the average refractive index perpendicular to the segment direction. The order parameter of the segment ($O^S$) with respect to the film's normal direction is defined as $O^S = (3<\cos \phi> - 1)/2$, wherein $\phi$ is the angle between the segment direction and the film's normal direction, and $<\cos \phi>$ is the average value of all segments' $\cos \phi$ values. For a solution cast polymer film, $O^S$ is always negative or zero. Therefore, in the case of non-zero $O^S$, the sign of $\Delta n$ is determined by the sign of $\Delta n^S$. $O^S$ preferably has a large absolute value, which requires a sufficiently large segment size or a sufficiently long persistent length.

Within segments, the OASU unit will further have an order parameter with respect to the segment direction (units within segment), defined as $O^{U-S} = (3<\cos \psi> - 1)/2$, where $\psi$ is the angle between the OASU optical axis direction and the segment direction, $<\cos \psi>$ is the average value of all the OASU's $\cos \psi$ values within a segment. Therefore, the segment's birefringence $\Delta n^S$ can be expressed as $\Delta n^S = \Delta n^{OASU} \times O^{U-S}$. The film's birefringence $\Delta n^S$ can thus be expressed as: $\Delta n = \Delta n^{OASU} \times O^{U-S} \times O^S$.

In another embodiment of the invention, birefringence may be controlled by selecting a polymer with OASUs that satisfy the equation:

$$\Delta n = \Delta n^{OASU} \times O^{U-S} \times O^S > 0$$

For a rod-like OASU, $\Delta n^{OASU} > 0$ and $O^S < 0$. Thus, positive C-plates require negative $O^{U-S}$. $O^{U-S}$ is negative when the rods are perpendicular to the segment direction. In a preferred embodiment, rod-like OASUs are selected such that the distance between the two attaching points of the neighboring OASUs is shorter than the length of the rod the so that they exhibit the buttressing effect. If the rod-like OASUs are selected according to these parameters, then the rods can no longer rotate freely. Instead, some conformation with rod direction parallel to the main chain direction will be forbidden due to steric hindrance. Further, the main polymer chain will be substantially rigid and linear over a long distance. All the possible conformation of the rods will generate an average orientation preferably perpendicular to the main chain and thus result in a negative $O_{U-S}$. In this embodiment, OASU may be attached to the main chain from any position as long as buttressing effect is present.

For a disk-like OASU, $\Delta n^{OASU} < 0$ and $O^S < 0$. Thus, positive C-plates require positive $O^{U-S}$. If the main chain has sufficient rigidity and the spacer is allowed to freely rotate, $O^{U-S}$ will be positive (according to a strict mathematic model, $O^{U-S} = \frac{1}{6}$ for this model). Considering the disk will avoid some parallel orientations due to steric hindrance, the order parameter may be more positive. In a preferred embodiment, positive $O^{U-S}$ is achieved by selecting disk-like OASUs when the main polymer chain is rigid and such that the distance between the two neighboring attaching points of the OASUs is shorter than the length of the rod so that they exhibit the buttressing effect.

Selecting OASUs according to the buttressing effect parameters allows birefringence to be manipulated because it generates and enhances the non-zero segment parameter, $O^{U-S}$. The buttressing effect will make some of the OASU's conformations forbidden and thus leads to the preferred orientation of the OASU. Especially for laterally attached rod-like OASU, the buttressing effect is the basic reason for the negative OASU order parameter within a segment $O^{U-S}$. Qualitatively, the bigger buttressing factor will have a stronger buttressing effect and make $O^{U-S}$ more negative for rod-like model and more positive for disk-like model.

An advantage of the invention is that compensation films with high birefringence may be obtained by a simple solution casting process without any other post-processing such as stretching, photopolymerization, etc. Solution casting without post-processing may significantly reduce the cost of film fabrication and help eliminate errors caused by the complexity of post-processing. In certain other embodiments, post-casting processing, such as uniaxially or biaxially stretching or photopolymerization, may be used to further enhance the compensation film's high positive birefringence. The order parameter of a polymer segment, $O^S$, is mainly determined by the conditions of solution casting, such as temperature, evaporation rate, and concentration. Thus, the conditions of solution casting impact the birefringence of the optical compensation film according to the equation $\Delta n = \Delta n^{OASU} \times O^{U-S} \times O^S$ described above.

A variety of solvents may be used for solution casting the optical compensation films of the invention including, but not limited to, chloroform, dichloromethane, dichloroethane, benzene, chlorobenzene, xylene, N,N-dimethylformamide, N,N-dimethylacetamide, N-methyl-2-pyrrolidone, pyridine, dimethylsulfoxide, acetonitrile, cyclohexanone, methyl amyl ketone, ethyl acetate, ethylene glycol monobutyl ether, and the like. Preferred solvents include toluene, methyl isobutyl ketone (MIBK), methyl ethyl ketone (MEK), and cyclopentanone.

Optical films may be cast onto a substrate from polymer solutions by a method known in the art such as, for example, spin coating, spray coating, roll coating, curtain coating, or dip coating. Substrates are known in the art, and include TAC (triacetylcellulose), polyester, polyvinyl alcohol, cellulose ester, polycarbonate, polyacrylate, polyolefin, polyurethane, polystyrene, glass, and other materials commonly used in an LCD device.

The solution-cast compensation film may be removed from the substrate after drying to yield a free-standing film. The already high birefringence of the film may optionally be further enhanced by uniaxial or biaxial stretching. The free-standing film may also be laminated onto a substrate.

Figure 5:
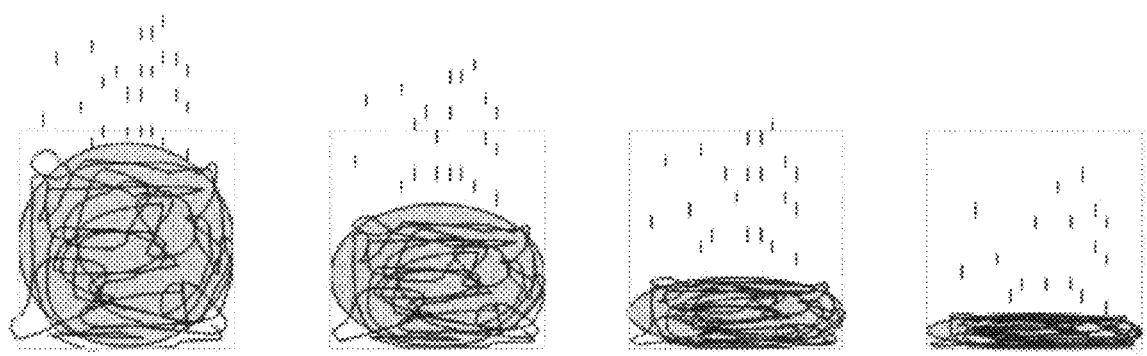
FIG. 5 is a depiction of the stages of solvent evaporation during solution casting.

Polymer chains have a random orientation in the homogeneous solution. The conformation of polymer chains in solution is generally a random coil, unless the polymer backbone is rigid while molecular weight is low, which may have a rod-like shape. As shown in FIG. 5, polymer chains in solution resemble loosely threaded-balls filled with solvent. After solution casting, the balls deflate during solvent evaporation and collapse into flatter "pancake" shapes. This process is continuous as long as solvent evaporation continues. As a result, the order parameter of the polymer segments, $O^s$, becomes more and more negative when the polymer collapses. Polymer chain segments become aligned parallel to the substrate surface. However, other factors such as competition between the evaporation rate of the solvent and the relaxation process of the polymer chains determine whether or not this aligned segment orientation is maintained.

When the solution for film casting is dilute, solvent evaporation generally follows a free relaxation model. During the free relaxation stage, the order parameter of the polymer segments is zero. During the free relaxation model, the system fluctuates between the collapsed ball shape and round ball shape. When the solution is dilute, the polymer's glass transition temperature is lower than the environment temperature so that polymer chains relax fast enough to compete with the collapse.

As solvent evaporates, the ball-shape becomes smaller and the solution on the substrate becomes increasingly concentrated. At a certain concentration, the glass transition temperature of the polymer chains is close to the environmental temperature, and polymer relaxations become too slow to follow the solvent's evaporation or the collapsing procedure. At this point, the polymer solution reaches the "frozen point" and the system follows the frozen model. At the frozen stage, the order parameter of the polymer segment is determined by the frozen point, $v_f$ according to the equation:

$$O^s = (v_f - 1)/(v_f + 2)$$

Thus, the final order parameter of the polymer segments after solution casting is determined by the frozen point, $v_f$. Because $v_f$'s value is between $v_0$ and 1 and thus in the range 0-1, according to equation $O^s = (v_f - 1)/(v_f + 2)$, $O^s$ is always negative. Thus, the statistical orientation of the polymer segments is always parallel to the surfaces of the substrates. However, the value of $O^s$ depends on the value of $v_f$, and $O^s$ is higher when $v_f$ is smaller. Thus, higher birefringence is achieved when $O^s$ is large and $v_f$ is small.

The value of $v_f$ may be determined by many factors including, but not limited to, evaporation rate of the solvent, environmental temperature, solubility of the polymer in the solvent and the chemical structure of the polymer, which affects relaxation. The evaporation rate is preferably slow enough to ensure that the ball shape collapses but fast enough to ensure that the relaxation rate is slower at more dilute concentrations. As is known in the art, evaporation rate may be adjusted by adjusting environmental temperature and pressure. The relaxation rate depends on the chemical structure of polymer and the film casting temperature. Polymers with rigid segments may freeze easily at the environmental temperature.

EXAMPLES

Example 1

Birefringence Measurement

Polymer samples were first dissolved in suitable solvents and were solution cast onto a piece of cleaned glass with the size of 1×1.5 inches. The thickness of the polymer film was controlled in the range of 15 to 20 μm by adjusting the content of solid in the solution. After the solvent evaporated, the polymer film was peeled off the glass to obtain a piece of free-standing film. Birefringence of the free-standing polymer films was measured by a prism coupler (Model 2010), from Metricon Corp. at 633 nm.

Example 2

Preparation of Poly(2-vinylnaphthalene) by Bulk Polymerization

2-Vinylnaphthalene (2.00 g) was charged to a Schlenk tube. The tube was stoppered, evacuated by pulling vacuum, and then filled with argon gas. The tube was evacuated and then refilled with argon four more times. While under a positive pressure of argon, the tube was immersed into an oil bath maintained at 70° C. for 24 hours. After cooling to room temperature, the solid plug of material was dissolved in tetrahydrofuran (THF). The solution was added in a dropwise manner into 500 mL of rapidly stirring methanol, causing the polymer to precipitate. The precipitated polymer was collected by filtration and dried by pulling air through the material on a filter pad. The polymer was then dissolved in fresh THF and reprecipitated by dropwise addition into rapidly stirring methanol. After collection by filtration and drying, the resulting polymer was found to have MW of 127,000 g/mol and a Tg of 139° C. A film cast from cyclopentanone (Cp) showed a positive birefringence of 0.0040 at 633 nm.

Example 3

Preparation of Poly(2-vinylnaphthalene) by Solution Polymerization

2-Vinylnaphthalene (2.01 g), azo-bis(isobuytronitrile) (AIBN, 1.5 mg) and benzene (0.98 g) were charged to a 50 mL round bottom flask containing a Teflon-coated magnetic stirbar. The reaction mixture was degassed by bubbling dry argon gas through the stirring reaction mixture for 15 minutes. The vessel contents were then kept under a positive pressure of argon and immersed into an oil bath maintained at 60° C. for 19 hours. The contents of the vessel were diluted with 25 mL of benzene after cooling the reaction mixture to room temperature. The resulting solution was slowly poured into 500 mL of rapidly stirring methanol, causing the resulting polymer to precipitate. The precipitated polymer was collected by filtration and dried by pulling air through the material on a filter pad. The polymer was then dissolved in tetrahydrofuran and reprecipitated by dropwise addition into rapidly stirring methanol. After collection by filtration and drying, the resulting polymer was found to have MW of 251,000 g/mol and a Tg of 148° C. A film cast from cyclopentanone showed a positive birefringence of 0.0073 at 633 nm.

Example 4

Preparation of Poly(2-vinylnaphthalene) by Emulsion Polymerization

2-Vinylnaphthalene (2.00 g), sodium dodecyl sulfate (0.40 g), and water (18.0 g) were charged to a 125 ml round bottom flask containing a Teflon-coated magnetic stirbar. The contents of the vessel were degassed by bubbling dry argon gas through the stirring reaction mixture for 30 minutes. The vessel contents were then kept under a positive pressure of argon and immersed into an oil bath maintained at 80° C. After 30 minutes at 80° C., the vessel was then charged with potassium persulfate solution (32 mg in 1 mL of water). After the initial charge of initiator solution, a fresh charge of potassium persulfate solution (32 mg in 1 mL water) was added to the reaction vessel every 2 hr. At the end of the 6 hr polymerization period, the reaction mixture was poured into 250 mL of rapidly stirring methanol. The addition of 200 mL of methylene chloride to the resulting suspension caused the polymer to precipitate. The precipitated polymer was collected by filtration and dried by pulling air through the material on a glass frit filter. The polymer was then redissolved in tetrahydrofuran and reprecipitated by dropwise addition into rapidly stirring methanol. After collection by filtration and drying, the resulting polymer was found to have MW of 550,000 g/mol and a Tg of 146° C. A film cast from cyclopentanone showed a positive birefringence of 0.0062 at 633 mm.

Example 5

Preparation of Poly(1-vinylpyrene) by Bulk Polymerization

1-Vinylpyrene (2.0 g) was charged to a Schlenk tube. The tube was stoppered, evacuated by pulling vacuum, and then filled with argon gas. The tube was evacuated and then refilled with argon four more times. While under a positive pressure of argon, the tube was immersed into an oil bath maintained at 100° C. for 24 hours. After cooling to room temperature, the solid plug of material was dissolved in tetrahydrofuran (THF). The solution was added in a dropwise manner into rapidly stirring ethanol, causing the polymer to precipitate. The precipitated polymer was collected by filtration and dried by pulling air through the material on a filter pad. The polymer was then dissolved in fresh THF and reprecipitated by dropwise addition into rapidly stirring ethanol. After collection by filtration and drying, the resulting polymer was found to have MW of 72,600 g/mol and a Tg of 254° C. A film cast from cyclopentanone showed a positive birefringence of 0.0051 at 633 mm.

Example 6

Preparation of Poly(N-Vinyl Phthalimide)

To a reaction tube were charged 1.0 g of N-vinylphthalimide and 1.3 g of a solution of benzoyl peroxide in chlorobenzene (1.0 mg/g). The reaction mixture was purged with argon, heated to 78° C., and allowed to react overnight. After cooled down to room temperature, the solution was poured to methanol. The resulting white precipitate was collected and dried to afford about 1 g of white powder. A film cast from γ-butyrolactone (GBL) showed Δn=0.0154 at 633 nm (only partially soluble in GBL). Another film cast from NMP showed Δn=0.0045 at 633 nm (brittle film).

Using the same method, two substituted poly(N-vinyl phthalimides), poly(N-vinyl-4,5-dichlorophthalimide) and poly(N-vinyl-4-trifluoromethylphthalimide), were also prepared. However, films could not be cast due to their poor solubility.

Example 7

Preparation of Poly(N-vinyl phthalimide-co-styrene)

According to the same method as in Example 6, copolymers were prepared by charging various mole ratios of styrene (S) with either N-vinyl phthalimide (VPI) or N-vinyl-4,5-dichlorophthalimide (VDCPI), Films were then cast from NMP and their birefringence measured as listed in the table below. It should be noted, however, the mole ratios of the resulting polymers could vary due to low yields (about 30%).

TABLE 1

| Copolymer | Styrene/VPI or VDCPI mole ratio used | Δn at 633 nm |
|---|---|---|
| P(S-co-VPI) | 1:1 | 0.0035 |
| P(S-co-VPI) | 1:3 | 0.0031 |
| P(S-co-VDCPI) | 1:3 | 0.0030 |
| P(S-co-VDCPI) | 7:1 | 0.0012 |

Example 8

Preparation of Poly(nitrostyrene) by Nitration of Styrene

Polystyrene (5.0 g) was stirred and dissolved in a solvent mixture of nitrobenzene (90 g) and 1,2-dichloroethane (30 g) in a three-neck round-bottom flask equipped with a mechanical stirrer. To the stirred mixture was added a mixed acid (nitro/styrene equivalent ratio=2/1) consisting of nitric acid (8.6 g) and concentrated sulfuric acid (10.0 g) dropwise in a period of 30 min. The mixture was allowed to react at room temperature under nitrogen for a total of 22 hours. The resulting yellow mixture was poured into diluted sodium hydroxide in water and organic layer separated, which was subsequently precipitated into methanol to give a solid mass. The solid was dissolved in N,N-dimethylformamide (DMF) and re-precipitated into methanol. The resulting heterogeneous mixture was stirred for two hours, filtered, washed repeatedly with methanol, and dried under vacuum to give a slightly yellowish fibrous powder. The yield was generally >95%.

Using the above method, various poly(nitrostyrenes) were prepared as listed below. Products 1-3 were prepared using a polystyrene with weight average molecular weight (MW) 280,000 and Tg 100° C. (Aldrich), while product 4 from one having MW 230,000 and Tg 94° C. (Aldrich).

TABLE 6

| Poly(nitrostyrene) | Polystyrene | Nitro/Styrene | Reaction Time, hours | Solubility | % N (DS) | Tg, ° C. | Δn @ 633 nm |
|---|---|---|---|---|---|---|---|
| 1 | Mw 280K, Tg 100° C. | 3/1 | 22 | DMF | 9.63 (1.02) | 189 | +0.0138 |
| 2 | Mw 280K, Tg 100° C. | 2/1 | 22 | Cp, DMF | 8.22 (0.87) | 174 | +0.0161 |
| 3 | Mw 280K, Tg 100° C. | 2/1 | 6 | Cp, DMF | 7.37 (0.78) | 147 | +0.0110 |
| 4 | Mw 230K, Tg 94° C. | 2/1 | 22 | Cp, DMF | 8.69 (0.92) | 177 | +0.0157 |

Product 1 was soluble in DMF but not in Cp, while the others were soluble in Cp. Films of 2, 3, and 4 were cast respectively from their Cp solutions by spreading the solutions on glass slides and allowing to dry at room temperature in air to form thin films (about 15-20 μm). A film of product 1 was cast from DMF and dried under vacuum due to the hygroscopic character of DMF. % N of the polymer was determined by elemental analysis, from which the degree of substitution (DS) of the nitro group was calculated.

Example 9

Figure 6:
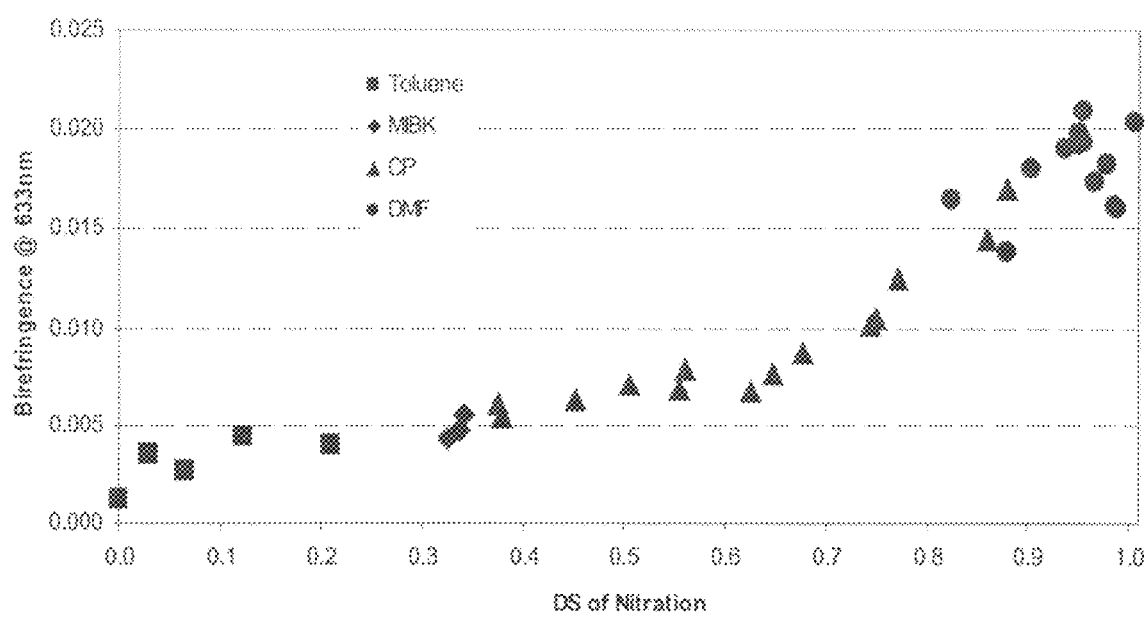
FIG. 6 is a plot showing how birefringence varies with the degree of substitution of Ar-BESs with nitro groups.

The Property Relationship of Poly(nitrostyrenes) Having Various Degrees of Substitution Using the same method in Example 8, a series of poly (nitrostyrenes) having various degrees of substitution (DS) were prepared by adjusting the nitro/styrene equivalent ratio. Their solubility and birefringence were then determined; the results are plotted in FIG. 6. As illustrated in FIG. 6, the solubility of the poly(nitrostyrene) decreases with increased DS. Those with DS greater than about 0.9 were only soluble in DMF, with DS between about 0.4 and about 0.9 were soluble in Cp and DMF; with DS about 0.35 were soluble in methyl isobutyl ketone (MIBK), Cp, and DMF; and with DS lower than about 0.3 were soluble in toluene, MIBK, Cp, and DMF. FIG. 6 also shows that the birefringence of the poly (nitrostyrene) increases with increased degree of nitration.

Example 10

Preparation of Nitrostyrene Copolymer

A copolymer was prepared by nitration of poly(styrene-co-acrylonitrile) (75% styrene, MW 165K; Aldrich) using the same method as in Example 8 with an equivalent ratio of nitro/styrene, 3/1. The resulting polymer had Tg of 151° C., % N 5.84 (DS 0.62) (excluding CN group), and was soluble in cyclopentanone (Cp). A film was cast from Cp and showed a positive birefringence of 0.0089 at 633 nm.

Example 11

Preparation of Poly(Bromostyrene) by Bromomination of Styrene

Polystyrene (5.0 g) (Mw 280,000; Aldrich) was stirred and dissolved in 1,2-dichloroethane (100 g) in a three-neck round-bottom flask equipped with a mechanical stirrer. To the stirred mixture was added AlCl$_3$ (0.1 g) followed by the addition of bromine (15.4 g) (Br/styrene equivalent ratio, 2/1) in a period of one hour. The mixture was allowed to react at room temperature under nitrogen for a total of 7 hours. The resulting red mixture was precipitated into methanol, filtered, and washed repeatedly with methanol to give a slightly yellowish fibrous powder (7.2 g). The product was soluble in toluene or Cp and has a Tg of 134° C., 34% of Br (DS 0.78). A film was cast from toluene and measured to have Δn+0.0069 @ 633 nm.

Example 12

Preparation of Bromostyrene Copolymer

A copolymer was prepared by bromination of poly(styrene-co-acrylonitrile) (75% styrene, MW 165K; Aldrich) using the same method as in Example 11 with an equivalent ratio of Br/styrene, 2/1. The resulting polymer had Tg of 141° C., 26% Br (DS 0.65), and was soluble in MIBK. A film cast from MIBK showed a positive birefringence of 0.0024 at 633 nm.

Example 13

Preparation of Poly(Bromo-Nitrostyrene) by Bromination of Poly(Nitrostyrene)

By using the same method as in Example 11, a poly (bromo-nitrostyrene) was prepared by bromination of a poly (nitrostyrene) having DS 0.47 prepared as in Example 7. In the reaction, poly(nitrostyrene) (3.0 g), AlCl$_3$ (0.1 g), and bromine (4.62 g) (Br/styrene 2/1) were used. The mixture was allowed to react for 5 hours to give a slightly yellowish powder (2.5 g); Tg 139° C.; soluble in MIBK or cyclopentanone; film cast from MIBK having Δn+0.0054 (633 nm.

Example 14

Preparation of Poly(Nitro-Bromostyrene) by Nitration of Poly(Bromostyrene)

By using the same method as in Example 8, a poly(nitrobromostyrene) was prepared by nitration of poly(bromostyrene) prepared in Example 11. In the reaction, poly(nitrostyrene) (2.50 g), $HNO_3$ (2.15 g), and $H_2SO_4$ (2.50 g) were used. The mixture was allowed to react for 5 hours to give a slightly yellowish powder (2.1 g); Tg 144° C.; % N 1.67; soluble in cyclopentanone.

Example 15

Nitration of Poly(2-vinylnaphthalene)

A nitro-substituted polymer was prepared by nitration of poly(2-vinylnaphthalene) (Mw 251 K; Tg 148° C.) using the same method as in Example 8 with an equivalent ratio of nitro/styrene, 2/1. The reaction was carried out by charging poly(2-vinylnaphthalene) (0.25 g), nitrobenzene (4.5 g), 1,2-dichloroethane (1.5 g), $HNO_3$ (0.29 g), and $H_2SO_4$ (0.34 g) to a 50 ml flask equipped with a magnetic stirrer. The mixture was allowed to react for 22 hours to give a powder (0.33 g). The resulting polymer had Tg of 199° C. and % N 2.17 (DS 0.31) and was soluble in cyclopentanone. A film cast from Cp showed a positive birefringence of 0.0088 at 633 nm.

Example 16

Nitration of Poly(4-vinyl biphenyl)

Similar to Example 15, a nitro-substituted polymer was prepared by nitration of poly(4-vinyl biphenyl) (Mw 396K; Tg 150° C.) by using poly(4-vinyl biphenyl) (0.25 g), nitrobenzene (4.5 g), 1,2-dichloroethane (1.5 g), $HNO_3$ (0.25 g), and $H_2SO_4$ (0.29 g). The resulting polymer had Tg of 192° C. and % N 2.30 (DS 0.37) and was soluble in cyclopentanone. A film cast from Cp showed a positive birefringence of 0.0097 at 633 mm.

Example 17

Bromination of Poly(styrene-co-4-vinyl biphenyl)

As in Example 11, a bromo-substituted polymer was prepared by bromination of poly(styrene-co-4-vinyl biphenyl) (Mw 229K) by using poly(styrene-co-4-vinyl biphenyl) (0.5 g), 1,2-dichloroethane (14 g), $AlCl_3$ (0.04 g), and bromine (1.54 g). The resulting polymer had Tg of 161° C., % Br of 35% (DS~1) and was soluble in toluene. A film cast from Cp showed a positive birefringence of 0.0028 at 633 nm.

Example 18

Alkylation and Nitration of Polystyrene

This example illustrates an MIBK-soluble poly(nitrostyrene) with high positive birefringence can be prepared by first reacting polystyrene with t-butylchloride and subsequently reacting with a mixed acid.

Alkylation: Polystyrene (5.20 g) (Mw 280,000; Aldrich) was stirred and dissolved in carbon disulfide (70 g) in a three-neck round-bottom flask equipped with a mechanical stirrer and a water condenser. To the stirred mixture was added $AlCl_3$ (0.01 g), followed by the addition of t-butyl chloride (2.31 g) (t-butyl/styrene equivalent ratio, 1/2). The mixture was allowed to reflux under nitrogen for 2 hours and then allowed to cool to room temperature. The resulting mixture was precipitated into methanol, filtered, washed repeatedly with methanol, and dried under vacuum to give a fibrous powder (6.32 g). The product was soluble in MIBK and has a Tg of 117° C. A film was cast from MIBK and measured to have $\Delta n=0.0027$ @ 633 nm.

Nitration: The above product after alkylation (1.5 g) was stirred and dissolved in nitrobenzene (25 g). To the mixture was added a mixed acid of $HNO_3$ (2.6 g) and $H_2SO_4$ (2.6 g) dropwise in a period of 30 minutes. The mixture was allowed to react at room temperature for 24 hours. After the reaction, the yellow mixture was washed with dilute NaOH in water. The organic layer was separated and precipitated into methanol, filtered, and then dissolved in DMF. The resulting polymer solution was re-precipitated into methanol, filtered, washed repeatedly with methanol, and dried under vacuum to give a yellowish fibrous powder (1.77 g). The product was soluble in MIBK and has a Tg of 171° C. A film was cast from MIBK and measured to have $\Delta n$ 0.0086 @ 633 nm.

Example: 19

Nitration of Poly(4-methylstyrene)

This example illustrates that the nitro group can be incorporated onto positions other than the para position of styrene and still enhance the birefringence of the polymer film. Poly(4-methylstyrene) (5.0 g; available from Scientific Polymer Products, Inc.; MW 100K) was stirred and dissolved in (100 g) in a three-neck round-bottom flask equipped with a mechanical stirrer. To the stirred mixture was added a mixed acid (nitro/styrene equivalent ratio=2/1) consisting of nitric acid (8.6 g) and concentrated sulfuric acid (17.2 g) dropwise in a period of 30 min. The mixture was allowed to react at room temperature under nitrogen for a total of 20 hours. The resulting yellow mixture was poured into diluted sodium hydroxide in water and organic layer separated, which was subsequently precipitated into methanol to give a solid mass. The solid was dissolved in N,N-dimethylformamide (DMF) and re-precipitated into methanol. The resulting heterogeneous mixture was stirred for two hours, filtered, washed repeatedly with methanol, and dried under vacuum to give a slightly yellowish fibrous powder. The product (about 95% yield) was soluble in cyclopentanone but not in MIBK or toluene. A film cast from cyclopentanone showed a positive birefringence of 0.0060 at 633 nm. (The starting material, poly(4-methylstyrene), was determined to have $\Delta n=0.0017$ at 633 nm.)

Comparative Example 20

Substituted Polystyrenes Having Low Positive Birefringence Values

This example shows that, in contrast to the BES-substituted polystyrenes of the present invention, the following substituted polystyrenes have low positive birefringence values.

TABLE 3

| | Molecular Weight | Birefringence at 633 nm (solvent used for film casting) |
|---|---|---|
| Polystyrene | 280K | 0.0012 (Toluene); 0.0020 (Cp) |
| Poly(4-methylstyrene) | 100K | 0.0017 (Toluene) |
| Poly(4-methoxystyrene) | 400K | 0.0028 (Toluene); 0.0024 (Cp) |
| Poly(4-chlorostyrene) | N/A | 0.0020 (Toluene); 0.0022 (Cp) |

Example 21

Preparation of Poly(4-vinylbiphenyl) by Bulk Polymerization

4-Vinylbiphenyl (1.38 g) was charged to a Schlenk tube. The tube was stoppered, evacuated by pulling vacuum, and then filled with argon gas. The tube was evacuated and then refilled with argon four more times. While under a positive pressure of argon, the tube was immersed into an oil bath maintained at 130° C. for 1.5 hours. After cooling to room temperature, the solid plug of material was dissolved in tetrahydrofuran (THF). The solution was added in a dropwise manner into 500 mL of rapidly stirring methanol, causing the polymer to precipitate. The precipitated polymer was collected by filtration and dried by pulling air through the material on a filter pad. The polymer was then dissolved in fresh THF and reprecipitated by dropwise addition into rapidly stirring methanol. After collection by filtration and drying, the resulting polymer was found to have MW of 396,000 g/mol and a Tg of 150° C. A film cast from cyclopentanone showed a positive birefringence of 0.0071 at 633 nm.

Example 22

Preparation of Poly(4-cyanostyrene) by Solution Polymerization

4-Cyanostyrene (1.65 g), azo-bis-isobuytronitrile (AIBN, 11 mg) and N,N-dimethylacetamide (DMAc, 1.65 g) were charged to a 50 mL round bottom flask containing a Teflon-coated magnetic stirbar. The reaction mixture was degassed by bubbling dry argon gas through the stirring reaction mixture for 15 minutes. The vessel contents were then kept under a positive pressure of argon and immersed into an oil bath maintained at 60° C. for 2.5 hours. The contents of the vessel were diluted with 25 mL of DMAc after cooling the reaction mixture to room temperature. The resulting solution was slowly poured into 500 mL of rapidly stirring methanol, causing the resulting polymer to precipitate. The precipitated polymer was collected by filtration and dried by pulling air through the material on a filter pad. The polymer was then dissolved in fresh DMAc and reprecipitated by dropwise addition into rapidly stirring methanol. After collection by filtration and drying, the resulting polymer was found to have MW of 842,000 g/mol and a Tg of 184° C. A film cast from cyclopentanone showed a positive birefringence of 0.0103 at 633 nm.

Comparative Example 23

Vinyl Polymers Having High Tg and Low Positive Birefringence

Polymers 1-5 were synthesized by free-radical solution polymerization and their Tg and birefringence values determined as listed in the following table:

TABLE 4

| | Polymer | Structure | Tg (° C.) | Δn at 633 nm |
|---|---|---|---|---|
| 1 | Poly(2-phenylaminocarbonylstyrene) | | 200 | 0.0032 |
| 2 | Poly(4-cyanophenyl methacrylate) | | 161 | 0.0009 |
| 3 | Poly(methylcarboxyphenyl methacrylamide) | | 211 | 0.0011 |

TABLE 4-continued

| Polymer | Structure | Tg (° C.) | Δn at 633 nm |
|---|---|---|---|
| 4 Poly(isobornyl methacrylate) | | 191 | 0.0006 |
| 5 Poly(phenyl methacrylamide) | | 160 | 0.0020 |

As shown in Table 4, Tg and positive birefringence are not directly proportional.

Example 24

Synthesis of Various Mesogen-Jacketed Polymers

The following mesogen-jacketed polymers were made by charging the vinyl mesogen monomers, benzoyl peroxide (BPO, 0.1-0.3% mole of monomers) and toluene or chlorobenzene to a polymerization tube containing a Teflon-coated magnetic stirbar. The reaction mixture was degassed by bubbling argon through for 15 minutes. The tube was then sealed and immersed into an oil bath maintained at 80° C. for one day. After cooling the reaction mixture to room temperature, it was slowly poured into rapidly stirring methanol, causing the resulting polymer to precipitate. The precipitated polymer was collected by filtration and dried in a vacuum oven.

1. Poly[2,5-bis(p-alkoxyphenyl)styrene]

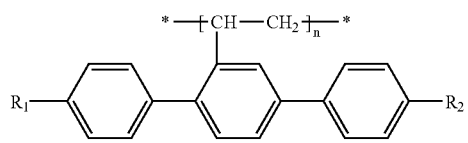

wherein $R_1$=—OCH$_2$CH(CH$_3$)CH$_2$CH$_3$, $R_2$=—OCH$_2$CH$_2$OCH$_3$ Δn=0.0082

2. Poly{2,5-bis[5-(4-substituted phenyl)-1,3,4-oxadiazole]styrene}

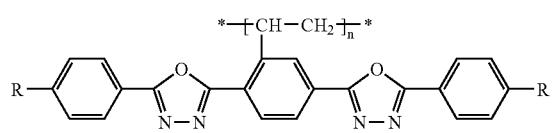

wherein R=—OC(CH$_3$)$_3$, —OC$_6$H$_{13}$, —OC$_8$H$_{17}$, —OC$_{10}$H$_{21}$, —OC$_{12}$H$_{25}$

| R | Mn (×10$^{-4}$) | Tg (° C.) | Δn |
|---|---|---|---|
| —OC(CH$_3$)$_3$ | 16 | 201 | 0.0184 |
| —OC$_6$H$_{13}$ | 16 | — | 0.0355 |
| —OC$_8$H$_{17}$ | 23 | 141 | 0.0362 |
| —OC$_{10}$H$_{21}$ | 23 | — | 0.0295 |
| —OC$_{12}$H$_{25}$ | — | 150 | 0.0229 |

3. Poly{3,5-bis[5-(4-ter-butylphenyl)-1,3,4-oxadiazole]styrene}

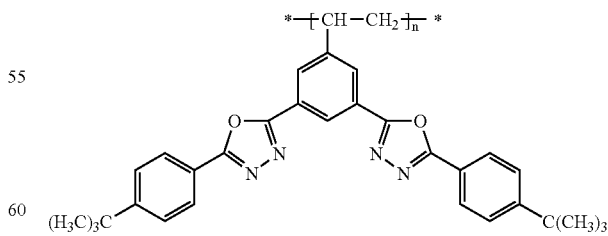

Tg=190° C., Δn=0.012

4. Poly{4-[5-(4-substituted phenyl)-1,3,4-oxadiazole]styrene} and Poly{2-[5-(4-substituted phenyl)-1,3,4-oxadiazole]styrene}

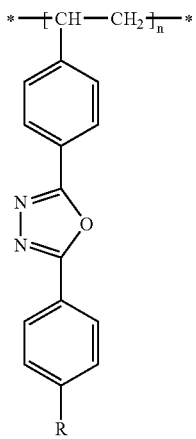

wherein R=phenyl, Δn=0.009

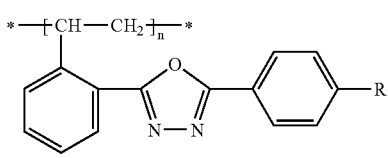

wherein R=—OC$_8$H$_{17}$, Tg=130° C., Δn=0.009; R=phenyl, Δn=0.009

5. Poly{2-(naphthalen-2-yl)-5-(prop-1-en-2-yl)-1,3,4-oxadiazole}

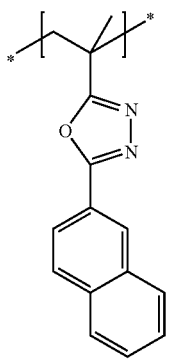

Δn=0.005

6. Triazole based mesogen-jacketed polymers

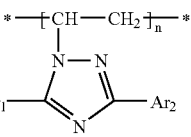

wherein Ar$_1$=4-(dodecyloxy)phenyl, Ar2=t-butyl; Δn=0.0045

Ar$_1$=4-(octyloxy)phenyl, Ar2=4-(octyloxy)biphenyl; Δn=0.011

Ar$_1$=4-(dodecyloxy)phenyl, Ar2=biphenyl; Δn=0.010

Ar$_1$=4-(dodecyloxy)biphenyl, Ar2=biphenyl; Δn=0.024

The following mesogen-jacketed polymers are suitable for the practice of this invention as well.

7. Poly-2,5-bis[(4-substituted benzoyl)oxy]styrene

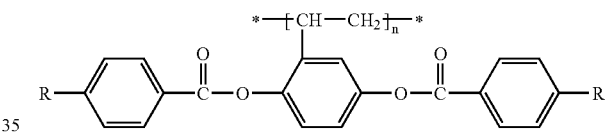

8. Poly-2,5-bis(4-substituted benzamido)styrene

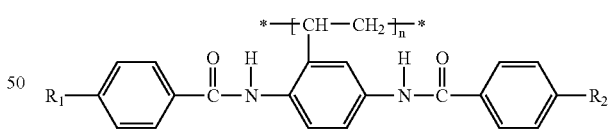

9. Poly-2,5-bis[(4-substituted phenyloxy)carbonyl]styrene

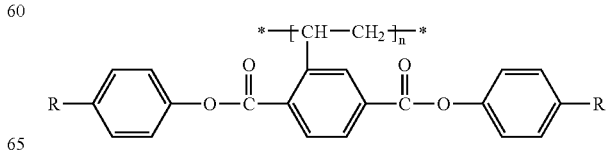

10. Poly{2,5-bis[(4-methoxyphenyloxy)carbonyl]styrene-b-styrene}

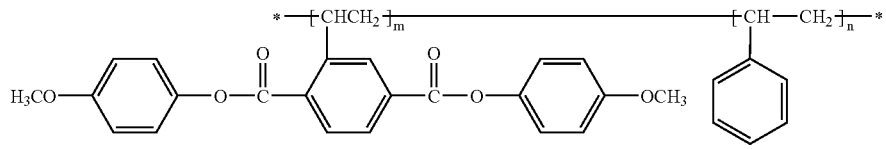

wherein m=2000, n=600, Tg: 100° C. and 120° C., Δn=0.010

Example 25

Poly(2-vinyl naphthalene)

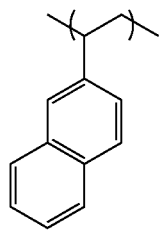

The buttressing factor B was calculated for a naphthalene ring OASU. Poly(2-vinyl naphthalene) has the same backbone structure as polystyrene (PS) and thus D is calculated the same as for polystyrene, yielding D=0.25 nm. The attaching atom of the OASU is the 2-position carbon atom on the naphthalene ring. All of the carbon-carbon bond lengths of the naphthalene ring are 0.14 nm, all bond angles of the naphthalene ring are 120°, and all carbon-hydrogen bond lengths of the naphthalene ring are 0.11 nm as shown in FIG. 7b. When parallel lines are drawn through the center of each atom of the OASU, as shown in FIG. 7c, of the bond angles of bonds 1, 2, 3, 4 and 5 with respect to the horizontal length of the OASU are all 30°. The left-most and right-most atoms are hydrogen atoms and have van der waals radii of 0.12 nm. Thus, R is calculated by:

$R$=(0.11 nm*cos 30°)+(0.14 nm*cos 30°)+(0.14 nm*cos 30°)+(0.14 nm*cos 30°+(0.11 nm*cos 30°)+0.12 nm+0.12 nm=0.79 nm.

The buttressing factor is calculated by B=R/D:

$B$=$R/D$=0.79 nm/0.25 nm=3.2.

This R/D value is bigger than PS and thus lead to a stronger buttressing effect and higher positive birefringence as compared to PS. Also, the naphthalene OASU has a bigger $\Delta n^{OASU}$ than PS, which enhanced the overall Δn. The solution cast poly(2-vinyl naphthalene) film showed a positive birefringence of 0.0073 at 633 nm.

Example 26 polyvinylpyrene (PVPr)

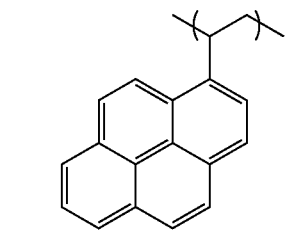

The buttressing factor B was calculated for a pyrene OASU. PVPr has the same backbone structure as polystyrene (PS) and thus D is calculated the same as for PS, yielding D=0.25 nm. The attaching atom of the OASU is a carbon atom on the pyrene ring. All of the carbon-carbon bond lengths of the pyrene ring are 0.14 nm, all bond angles of the pyrene ring are 120°, and all carbon-hydrogen bond lengths of the pyrene ring are 0.11 nm shown in FIG. 8b. When parallel lines are drawn through the center of each atom of the OASU, the bond angles of bonds 1, 2, 3, 4, 5, 6 and 7 with respect to the horizontal length of the OASU as shown in FIG. 8c are all 300. The left-most and right-most atoms are hydrogen atoms and have van der waals radii of 0.12 nm. Thus, R is calculated by:

$R$=(0.1 mm×cos 30°)+(0.14 nm×cos 30°)+(0.14 nm×cos 30°)+(0.14 nm×cos 30°)+(0.14 nm×cos 30°)+(0.14 nm×cos 30°)+(0.11 nm×cos 30°)+0.12 nm+0.12 nm=1.04 nm The buttressing factor is calculated by B=R/D:

$B$=$R/D$=1.04/0.25=4.1

This R/D value is bigger than PS and thus lead to stronger buttressing effect and higher positive birefringence as compared to PS. Also, the pyrene OASU has a bigger $\Delta n^{OASU}$ than PS, which enhanced the final Δn. The solution cast PVPr film showed a positive birefringence of 0.0051 at 633 nm.

Example 27

Substituted Polystyrene

A BES at the 4-position of benzene ring enhanced the birefringence of polystyrene without changing its buttressing effect. Polystyrene was substituted at the 4-position with the following BES: Cl, Br, I, CN, NO$_2$, and phenyl. Each BES-substituted polystyrene had the same buttressing factor (R/D value) as unsubstituted polystyrene but exhibited enhanced birefringence. Using the highly polarizable and polar $NO_2$ group enhanced the birefringence of BES-substituted polystyrene to as high as 0.0209.

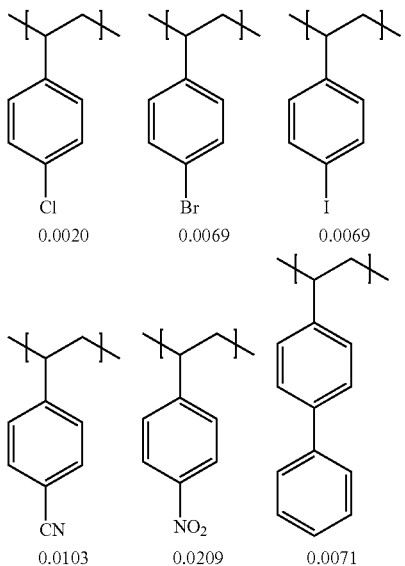

Example 28

Mesogen-Jacketed Polymer

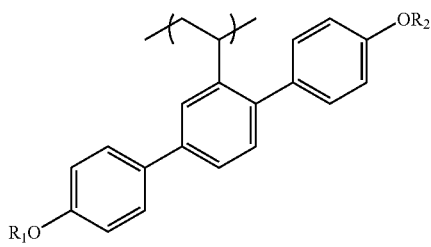

The buttressing factor was calculated for the mesogen OASU depicted above. The mesogen OASU has the same backbone structure as polystyrene (PS) and thus D is calculated the same as for PS, yielding 0.25 nm. The attaching atom of the OASU is a carbon atom on the middle benzene ring of the mesogen OASU. All of the carbon-carbon bond lengths of the benzene rings are 0.14 nm, all bond angles of the benzene rings are 120°, the carbon-carbon bond between two benzene rings is 0.15 nm, and all carbon-oxygen bond lengths of the mesogen are 0.14 nm shown in FIG. 9. The length between carbon 1 and carbon 4 of the benzene rings (depicted as lines 2, 4 and 6 in FIG. 9) is 0.28 nm. Although the three benzene rings don't lie in the same plane because the OASU may twist on its axis, the benzene rings maintain a linear alignment. When the two oxygen atoms are connected by a straight line as shown in FIG. 9, the 1-, 4-carbon atoms of all three benzene rings lie on that line. When parallel lines are drawn through the center of each atom of the OASU, the bond angles of bonds 1, 3, 5 and 7 and lines 2, 4 and 6 with respect to the horizontal length of the OASU as shown in FIG. 9 are all 30°.

The left-most and right-most atoms are oxygen atoms and have van der waals radii of 0.15 nm. The $R_1$ and $R_2$ alkyl groups are not included in the calculation of R because their bonds are flexible. Thus, R is calculated by:

$R = (0.14 \text{ nm} \times \cos 30°) + (0.28 \text{ nm} \times \cos 30°) + (0.15 \text{ nm} \times \cos 30°) + (0.28 \text{ nm} \times \cos 30°) + (0.15 \text{ nm} \times \cos 30°) + (0.28 \text{ nm} \times \cos 30°) + (0.14 \text{ nm} \times \cos 30°) + 0.15 \text{ nm} + 0.15 \text{ nm} = 1.53 \text{ nm}$ The buttressing factor is calculated by B=R/D:

$B = R/D = 1.53/0.25 = 6.1$

This R/D value is bigger than PS and thus lead to stronger buttressing effect and higher positive birefringence as compared to PS. Also, this mesogen OASU has a bigger $\Delta n^{OASU}$ than PS, which enhanced the final $\Delta n$. The solution cast this mesogen jacket polymer film (with $R_1$ as —$OCH_2CH_2OCH_3$, and $R_2$ as —$CH_2CH(CH_3)CH_2CH_3$) showed a positive birefringence of 0.0082 at 633 nm.

Example 29

Preparation of Poly(N-vinyl-4-tert-butylphthalimide) by Solution Polymerization

N-Vinyl-4-tert-butylphthalimide (2.0 g), chlorobenzene (6.0 g), and benzoyl peroxide (2.1 mg) were charged to a Schlenk tube containing a Teflon-coated magnetic stirbar. The tube was stoppered and degassed through the sidearm by three freeze-pump-thaw cycles. While under a positive pressure of argon, the reaction tube was immersed into an oil bath maintained at 85° C. for 3 hours with constant stirring. After cooling to room temperature, the resulting viscous solution was diluted with 10 mL of tetrahydrofuran (THF) and added in a dropwise manner into 500 mL of rapidly stirring methanol, causing the polymer to precipitate. The precipitated polymer was collected by filtration and dried by pulling air through the material on a filter pad. The polymer was reprecipitated twice more from fresh THF solution by dropwise addition into methanol. After collection by filtration and drying, the resulting polymer was found to be soluble in MIBK and toluene and had a Tg of 215° C. and a weight average molecular weight (Mw): 643, 000. A film cast from toluene showed a positive birefringence of 0.0094 at 633 nm.

Example 30

UV Spectra of Various Mesogen-Jacketed Polymers

The following table is a collection of the absorption maximum ($\lambda$max) and the birefringence ($\Delta n$) measured at the wavelength of 633 nm for each polymer. The first five polymers (PC6, PC8, PC10, PC12, PCt) are poly{2,5-bis[(4-alkyloxyphenyl)-1,3,4-oxadiazole]styrene} with the following chemical structure:

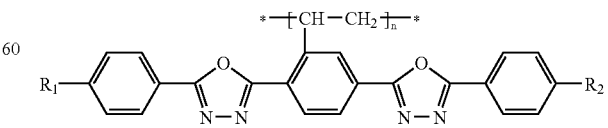

wherein $R_1$ and $R_2$ are defined in Table 5 below.

Sample XCt is poly{3,5-bis[(4-ter-butylphenyl)-1,3,4-oxadiazole]styrene} with the following chemical structure:

TABLE 5

*―[CH―CH$_2$]$_n$―*

(structure: central phenyl with two 1,3,4-oxadiazole rings, each bearing a 4-tert-butylphenyl group)

| Sample | R$_1$=R$_2$ | λmax, nm | Δn(633) |
|---|---|---|---|
| PC6 | —OC$_6$H$_{13}$ | 319.8 | 0.0355 |
| PC8 | —OC$_8$H$_{17}$ | 319.1 | 0.0362 |
| PC10 | —OC$_{10}$H$_{21}$ | 315.7 | 0.0295 |
| PC12 | —OC$_{12}$H$_{25}$ | 319.8 | 0.0229 |
| PCt | —C(CH$_3$)$_3$ | 309.6 | 0.0184 |
| XCt | N/A | 281.6 | 0.0117 |

UV-Visible Spectrophotomer (UV-2450) from Shimadzu (Japan) was used to obtain UV spectrum of the above polymers, shown in Figure X. λ$_{max}$ is the wavelength of the absorption maximum. Δn$_{(633)}$ was measured with Prism Coupler (Model 2010) from Mitricon Corp.

The present invention is not to be limited in scope by the specific embodiments described herein which are intended as single illustrations of individual aspects of the invention, and functionally equivalent methods and components are within the scope of the invention. Indeed, various modifications of the invention, in addition to those shown and described herein will become apparent to those skilled in the art from the foregoing description and accompanying drawings. Such modifications are intended to fall within the scope of the claims. Various publications are cited herein, the contents of which are hereby incorporated, by reference, in their entireties.

What is claimed is:

1. A positive birefringence layer made from a non-stretched, non-photopolymerized polymer film for use in liquid crystal displays, the film being stable at ambient conditions, the film having a positive birefringence $\Delta n = n_z - (n_x + n_y)/2$ that is greater than 0.002 throughout the wavelength range of 400 nm<λ<800 nm, wherein $n_x$ and $n_y$ represent in-plan refractive indexes, and $n_z$ represents the thickness-direction refractive index of the film, the film having been cast onto a substrate from a solution of a soluble polymer having a moiety of

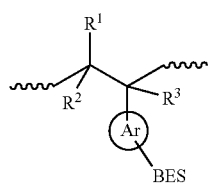

wherein R$_1$, R$_2$, and R$_3$ are each independently hydrogen atoms, alkyl groups, substituted alkyl groups, or halogens;
wherein Ar-BES is an optically anisotropic subunit (OASU) that is attached directly to the polymer backbone via one covalent bond, wherein Ar is an aromatic ring structure, BES represents at least one birefringence enhancing substituent;
wherein the Ar-BES is oriented perpendicular to the polymer backbone, and the higher the perpendicularity of the Ar-BES, the larger the value of the positive birefringence of the polymer film.

2. The positive birefringence layer of claim 1 wherein the polymer is a homopolymer.

3. The positive birefringence layer of claim 1 wherein the film is capable of forming an out-of-plane anisotropic alignment upon solvent evaporation without being subject to heat treatment, photo irradiation, or stretching and has a positive birefringence greater than 0.002 throughout the wavelength range of 400 nm<λ<800 nm.

4. The positive birefringence layer of claim 3 wherein the film is removed from the substrate upon drying to yield a free-standing film.

5. The positive birefringence layer of claim 4, wherein the free-standing film is uniaxially or biaxially stretched.

6. The positive birefringence layer of claim 4, wherein the free-standing film is attached to a substrate by means of lamination.

7. The positive birefringence layer of claim 5, wherein the free-standing film is attached to a substrate by lamination.

8. The positive birefringence layer of claim 1 wherein the film is capable of forming an out-of-plane anisotropic alignment upon solvent evaporation without being subject to heat treatment, photo irradiation, or stretching and has a positive birefringence greater than 0.005 throughout the wavelength range of 400 nm<λ<800 nm.

9. The positive birefringence layer of claim 8 wherein the film is removed from the substrate upon drying to yield a free-standing film.

10. The positive birefringence layer of claim 9, wherein the free-standing film is uniaxially or biaxially stretched.

11. The positive birefringence layer of claim 9, wherein the free-standing film is attached to a substrate by means of lamination.

12. The positive birefringence layer of claim 10, wherein the free-standing film is attached to a substrate by lamination.

13. The positive birefringence layer of claim 1 wherein the film is capable of forming an out-of-plane anisotropic alignment upon solvent evaporation without being subject to heat treatment, photo irradiation, or stretching and has a positive birefringence greater than 0.01 throughout the wavelength range of 400 nm<λ<800 nm.

14. The positive birefringence layer of claim 13 wherein the film is removed from the substrate upon drying to yield a free-standing film.

15. The positive birefringence layer of claim 14, wherein the free-standing film is uniaxially or biaxially stretched.

16. The positive birefringence layer of claim 14, wherein the free-standing film is attached to a substrate by means of lamination.

17. The positive birefringence layer of claim 15, wherein the free-standing film is attached to a substrate by lamination.

18. The positive birefringence layer of claim 1 wherein polymer composition is soluble in a solvent selected from the group consisting of toluene, methyl isobutyl ketone, cyclopentanone, and a mixture thereof.

19. The positive birefringence layer of claim 18 wherein BES is nitro- or bromo-.

20. The positive birefringence layer of claim 1 wherein polymer composition is soluble in a solvent selected from the group consisting of toluene, methyl isobutyl ketone, and a mixture thereof.

21. The positive birefringence layer of claim 20 wherein BES is nitro- or bromo-.

22. The positive birefringence layer of claim 1 wherein the film is used in a liquid crystal display device.

23. The positive birefringence layer of claim 22 wherein the liquid crystal display device is an in-plane switching liquid crystal display device.

24. The positive birefringence layer of claim 22 wherein the liquid crystal display device is used as a screen for a television or computer.

25. The positive birefringence layer of claim 1 further comprising controlling the degree of substitution of the BES.

26. The positive birefringence layer of claim 1 wherein the degree of substitution of the BES is greater than 0.5.

27. The positive birefringence layer of claim 1 wherein the BES is selected from the group consisting of nitro-, bromo-, iodo-, cyano- and phenyl-.

28. The positive birefringence layer of claim 27 wherein the BES is nitro- or bromo-.

29. The positive birefringence layer of claim 1 wherein the aromatic ring is selected from the group consisting of benzene, biphenyl, naphthalene, anthracene, phenanthrene, naphthacene, pentacene, and triphenyl.

30. The positive birefringence layer of claim 29 wherein the aromatic ring is benzene.

31. The positive birefringence layer of claim 1 wherein BES is nitro- or bromo- and the aromatic ring is selected from the group consisting of benzene, biphenyl, naphthalene, anthracene, phenanthrene, naphthacene, pentacene, and triphenyl.

32. The positive birefringence layer of claim 1 wherein the polymer is poly(nitrostyrene).

33. The positive birefringence layer of claim 32 wherein the poly(nitrostyrene) has a positive birefringence greater than 0.007 throughout the wavelength range of 400 nm<λ<800 nm.

34. The positive birefringence layer of claim 33 wherein the poly(nitrostyrene) has a degree of substitution greater than 0.7 for the nitro group.

35. The positive birefringence layer of claim 32 wherein the poly(nitrostyrene) has a degree of substitution greater than 0.5 for the nitro group.

36. The positive birefringence layer of claim 32 wherein the poly(nitrostyrene) has a degree of substitution greater than 0.7 for the nitro group.

37. The positive birefringence layer of claim 32 wherein BES comprises para-nitro groups.

38. The positive birefringence layer of claim 32 wherein BES consists of para-nitro groups.

39. The of claim 38 wherein the poly(nitrostyrene) has a degree of substitution greater than 0.5 for the nitro group.

40. The positive birefringence layer of claim 38 wherein the poly(nitrostyrene) has a degree of substitution greater than 0.7 for the nitro group.

41. The positive birefringence layer of claim 1 wherein the polymer is poly(bromostyrene).

42. The positive birefringence layer of claim 41 wherein the poly(bromostyrene) has a positive birefringence greater than 0.005 throughout the wavelength range of 400 nm<λ<800 nm.

43. The positive birefringence layer of claim 42 wherein the poly(bromostyrene) has a degree of substitution greater than 0.7 for the bromo group.

44. The positive birefringence layer of claim 41 wherein the poly(bromostyrene) has a degree of substitution greater than 0.5 for the bromo group.

45. The positive birefringence layer of claim 41 wherein the poly(bromostyrene) has a degree of substitution greater than 0.7 for the bromo group.

46. The positive birefringence layer of claim 41 wherein BES comprises para-bromo groups.

47. The positive birefringence layer of claim 41 wherein BES consists of para-bromo groups.

48. The positive birefringence layer of claim 47 wherein the poly(bromostyrene) has a degree of substitution greater than 0.5 for the bromo group.

49. The positive birefringence layer of claim 47 wherein the poly(bromostyrene) has a degree of substitution greater than 0.7 for the bromo group.

50. A positive birefringence layer made from a non-stretched, non-photocopolymerized copolymer film for use in positive birefringence layers in liquid crystal displays, the film being stable at ambient conditions, the film having a positive birefringence $\Delta n = n_z - (n_x + n_y)/2$ that is greater than 0.002 throughout the wavelength range of 400 nm<λ<800 nm, wherein $n_x$ and $n_y$ represent in-plan refractive indexes, and $n_z$ represents the thickness-direction refractive index of the film, the film having been cast from a solution of a soluble copolymer having a moiety of:

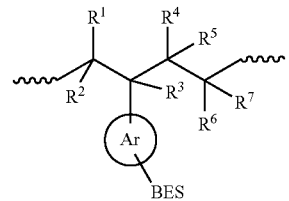

wherein $R^1$, $R^2$, $R^3$, $R^4$, $R^5$, and $R^7$ are each independently hydrogen atoms, alkyl groups, substituted alkyl groups, or halogens; wherein $R^6$ is a hydrogen atom, alkyl, substituted alkyl, halogen, ester, amide, ketone, ether, cyano, phenyl, epoxy, urethane, urea or optically anisotropic subunit (OASU) attached directly to the backbone of the residue of an ethylenically unsaturated monomer;
wherein Ar-BES is an optically anisotropic subunit (OASU) that is attached directly to the copolymer backbone via one covalent bond, wherein Ar is an aromatic ring structure with at least one birefringence enhancing substituent (BES);
wherein the Ar-BES is oriented perpendicular to the copolymer backbone, and the higher the perpendicularity of the Ar-BES, the larger the value of the positive birefringence of the copolymer film.

51. The positive birefringence layer of claim 50 wherein $R^6$ is an Ar-BES.

52. The positive birefringence layer of claim 50 wherein the copolymer comprises at least two different Ar-BES groups.

53. The positive birefringence layer of claim 50 wherein at least one ethylenically unsaturated monomer is selected from the group consisting of styrene, vinyl biphenyl, methyl methacrylate, butyl acrylate, acrylic acid, methacrylic acid, acrylonitrile, 2-ethylhexyl acrylate, and 4-t-butylstyrene.

54. The positive birefringence layer of claim 53 wherein at least one monomer of the copolymer further comprises styrene.

55. The positive birefringence layer of claim 50 wherein the film is capable of forming an out-of-plane anisotropic alignment upon solvent evaporation without being subject to heat treatment, photo irradiation, or stretching and has a positive birefringence greater than 0.002 throughout the wavelength range of 400 nm<λ<800 nm.

56. The positive birefringence layer of claim 55 wherein the film is removed from the substrate upon drying to yield a free-standing film.

57. The positive birefringence layer of claim 56, wherein the free-standing film is uniaxially or biaxially stretched.

58. The positive birefringence layer of claim 56, wherein the free-standing film is attached to a substrate by means of lamination.

59. The positive birefringence layer of claim 57, wherein the free-standing film is attached to a substrate by lamination.

60. The positive birefringence layer of claim 50 wherein the film is capable of forming an out-of-plane anisotropic alignment upon solvent evaporation without being subject to heat treatment, photo irradiation, or stretching and has a positive birefringence greater than 0.005 throughout the wavelength range of 400 nm<$\lambda$<800 nm.

61. The positive birefringence layer of claim 60 wherein the film is removed from the substrate upon drying to yield a free-standing film.

62. The positive birefringence layer of claim 61, wherein the free-standing film is uniaxially or biaxially stretched.

63. The positive birefringence layer of claim 61, wherein the free-standing film is attached to a substrate by means of lamination.

64. The positive birefringence layer of claim 62, wherein the free-standing film is attached to a substrate by lamination.

65. The positive birefringence layer of claim 50 wherein the film is capable of forming an out-of-plane anisotropic alignment upon solvent evaporation without being subject to heat treatment, photo irradiation, or stretching and has a positive birefringence greater than 0.01 throughout the wavelength range of 400 nm<$\lambda$<800 nm.

66. The positive birefringence layer of claim 65 wherein the film is removed from the substrate upon drying to yield a free-standing film.

67. The positive birefringence layer of claim 66, wherein the free-standing film is uniaxially or biaxially stretched.

68. The positive birefringence layer of claim 66, wherein the free-standing film is attached to a substrate by means of lamination.

69. The positive birefringence layer of claim 67, wherein the free-standing film is attached to a substrate by lamination.

70. The positive birefringence layer of claim 50 wherein polymer composition is soluble in a solvent selected from the group consisting of toluene, methyl isobutyl ketone, cyclopentanone, and a mixture thereof.

71. The positive birefringence layer of claim 50 wherein polymer composition is soluble in a solvent selected from the group consisting of toluene, methyl isobutyl ketone, and a mixture thereof.

72. The positive birefringence layer of claim 50 wherein BES is nitro- or bromo-.

73. The positive birefringence layer of claim 50 wherein the film is used in a liquid crystal display device.

74. The positive birefringence layer of claim 73 wherein the liquid crystal display device is an in-plane switching liquid crystal display device.

75. The positive birefringence layer of claim 73 wherein the liquid crystal display device is used as a screen for a television or computer.

76. The positive birefringence layer of claim 50 further comprising controlling the degree of substitution of the BES.

77. The positive birefringence layer of claim 50 wherein the degree of substitution of the BES is greater than 0.5.

78. The positive birefringence layer of claim 50 wherein the BES is selected from the group consisting of nitro-bromo-, iodo-, cyano- and phenyl-.

79. The positive birefringence layer of claim 78 wherein the BES is nitro- or bromo-.

80. The positive birefringence layer of claim 50 wherein the aromatic ring is selected from the group consisting of benzene, biphenyl, naphthalene, anthracene, phenanthrene, naphthacene, pentacene, and triphenyl.

81. The positive birefringence layer of claim 80 wherein the aromatic ring is benzene.

82. The positive birefringence layer of claim 50 wherein BES is nitro- or bromo- and the aromatic ring is selected from the group consisting of benzene, biphenyl, naphthalene, anthracene, phenanthrene, naphthacene, pentacene, and triphenyl.

83. The positive birefringence layer of claim 50 wherein the polymer is poly(nitrostyrene-co-styrene).

84. The positive birefringence layer of claim 83 wherein the poly(nitrostyrene-co-styrene) has a degree of substitution of the nitro group is greater than 0.5 for the nitro group.

85. The positive birefringence layer of claim 83 wherein the poly(nitrostyrene-co-styrene) has a degree of substitution of the nitro group is greater than 0.7 for the nitro group.

86. The positive birefringence layer of claim 83 wherein BES comprises para-nitro groups.

87. The positive birefringence layer of claim 83 wherein BES consists of para-nitro groups.

88. The positive birefringence layer of claim 87 wherein the poly(nitrostyrene-co-styrene) has a degree of substitution greater than 0.5 for the nitro group.

89. The positive birefringence layer of claim 87 wherein the poly(nitrostyrene-co-styrene) has a degree of substitution greater than 0.7 for the nitro group.

90. The positive birefringence layer of claim 50 wherein the polymer is poly(bromostyrene-co-styrene).

91. The positive birefringence layer of claim 90 wherein the poly(bromostyrene-co-styrene) has a degree of substitution greater than 0.5 for the bromo group.

92. The positive birefringence layer of claim 90 wherein the poly(bromostyrene-co-styrene) has a degree of substitution greater than 0.7 for the bromo group.

93. The positive birefringence layer of claim 90 wherein BES comprises para-bromo groups.

94. The positive birefringence layer of claim 90 wherein BES consists of para-bromo groups.

95. The positive birefringence layer of claim 94 wherein the poly(bromostyrene-co-styrene) has a degree of substitution greater than 0.5 for the bromo group.

96. The positive birefringence layer of claim 94 wherein the poly(bromostyrene-co-styrene) has a degree of substitution greater than 0.7 for the bromo group.

* * * * *